(12) United States Patent
Mambro et al.

(10) Patent No.: US 11,326,471 B2
(45) Date of Patent: May 10, 2022

(54) SYSTEM AND METHOD TO IMPROVE BOILER AND STEAM TURBINE START-UP TIMES

(71) Applicant: GENERAL ELECTRIC COMPANY, Schenectady, NY (US)

(72) Inventors: Antonio Mambro, Wettingen (CH); William Miller, Baden (CH); Francesco Congiu, Zurich (CH); Danny Gelbar, Enfield, CT (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/108,408

(22) Filed: Dec. 1, 2020

(65) Prior Publication Data
US 2021/0285335 A1    Sep. 16, 2021

Related U.S. Application Data

(63) Continuation-in-part of application No. 16/819,428, filed on Mar. 16, 2020, now Pat. No. 11,125,118.

(51) Int. Cl.
*F01D 25/10*     (2006.01)
*F01K 7/16*      (2006.01)
(Continued)

(52) U.S. Cl.
CPC .............. *F01D 25/10* (2013.01); *F01K 7/165* (2013.01); *F01K 11/04* (2013.01); *F22B 3/06* (2013.01);
(Continued)

(58) Field of Classification Search
CPC . F01K 13/02; F01K 3/24; F01K 7/165; F01D 17/145; F25J 2240/70
See application file for complete search history.

(56) References Cited

U.S. PATENT DOCUMENTS 44,851 A    11/1864  Champlin
192,036 A    6/1877  Vanosdol
(Continued)

FOREIGN PATENT DOCUMENTS

EP    0908603 A1    4/1999
GB    1382342       1/1975

OTHER PUBLICATIONS

Beevers et al., "On the Prediction and Theory of the Temperature Increase of Low Pressure Last Stage Moving Blades During Low Volume Flow Condition, and Limiting it Through Steam Extraction Methods", Proceedings of Asme Turbo Expro 2014, Turbine Technical Conference and Exposition, GT 2014, Jun. 16 -20, 2014, Dusseldorf, Germany.
(Continued)

*Primary Examiner* — Shafiq Mian
(74) *Attorney, Agent, or Firm* — Grogan, Tuccillo & Vanderleeden, LLP

(57) ABSTRACT

A system for warming a power generation system including a boiler and a mixer fluidly coupled to the boiler, a turbine first section operable to receive steam from the boiler at a first temperature. The turbine supplies steam at a second temperature to a first heat exchanger operably connected to receive the heated steam at the second temperature from the output of at least the first section of the turbine and transfer heat to at least one of water and steam in the boiler or the mixer, feedwater for the boiler, and a thermal energy storage system. The system further includes a control unit configured to receive the monitored operating characteristic and control the amount of steam directed through the turbine.

27 Claims, 6 Drawing Sheets

(51) Int. Cl.
  *F01K 11/04* (2006.01)
  *F22D 1/32* (2006.01)
  *F24H 7/02* (2022.01)
  *F22B 3/06* (2006.01)
  *F22B 27/14* (2006.01)
(52) U.S. Cl.
  CPC .............. *F22B 27/14* (2013.01); *F22D 1/325* (2013.01); *F24H 7/02* (2013.01); *F05D 2220/31* (2013.01); *F05D 2260/20* (2013.01); *F05D 2260/42* (2013.01)

(56) References Cited

U.S. PATENT DOCUMENTS

| | | | | |
|---|---|---|---|---|
| 3,163,009 | A * | 12/1964 | Rankin | F01K 9/023 60/652 |
| 4,048,012 | A | 9/1977 | George et al. | |
| 5,029,443 | A | 7/1991 | Hauser | |
| 5,042,246 | A | 8/1991 | Moore et al. | |
| 5,396,865 | A | 3/1995 | Freeh | |
| 5,412,936 | A * | 5/1995 | Lee | F01K 23/101 60/801 |
| 7,107,774 | B2 | 9/2006 | Radovich | |
| 8,276,382 | B2 | 10/2012 | Hu et al. | |
| 8,573,196 | B2 | 11/2013 | Plotkin et al. | |
| 9,228,452 | B2 * | 1/2016 | Terdalkar | F01K 13/02 |
| 9,347,685 | B2 | 5/2016 | Plotkin et al. | |
| 9,803,504 | B2 * | 10/2017 | Park | F01K 3/24 |
| 2005/0034445 | A1 * | 2/2005 | Radovich | F01K 23/10 60/39.182 |
| 2010/0236240 | A1 * | 9/2010 | Hu | F02C 6/18 60/653 |
| 2012/0031395 | A1 | 2/2012 | Plotkin et al. | |
| 2013/0044851 | A1 | 2/2013 | Winters et al. | |
| 2015/0192036 | A1 * | 7/2015 | Sharp | F22G 1/165 60/39.182 |
| 2016/0115869 | A1 | 4/2016 | Migl et al. | |
| 2017/0058702 | A1 * | 3/2017 | Park | F01K 3/24 |

OTHER PUBLICATIONS

Corresponding PCT Int. Application No. PCT/US2021/021060 International Search Report and Written Opinion dated May 27, 2021.

* cited by examiner

SYSTEM AND METHOD TO IMPROVE BOILER AND STEAM TURBINE START-UP TIMES

CROSS-REFERENCE TO RELATED APPLICATIONS

This application is a continuation-in-part of U.S. application Ser. No. 16/819,428, filed on Mar. 16, 2020, the recitations of which are incorporated herein by reference in their entirety.

BACKGROUND

Technical Field

Embodiments, as described herein, generally relate to heat recovery steam generators for combined cycle power plants and boilers for conventional steam power plants. More particularly, to a system and method for improving the control, performance, and responsiveness of steam generators.

DISCUSSION OF ART

A boiler typically includes a furnace where fuel is burned to generate heat to produce steam. The fuel combustion creates thermal energy or heat, which is used to heat and vaporize a liquid, such as water, which makes steam. The generated steam may drive a turbine to generate electricity or provide heat for other purposes. Fossil fuels, such as pulverized coal, natural gas, and the like are conventional fuels used in many combustion systems for boilers. For example, in an air-fired pulverized coal boiler, atmospheric air is fed into the furnace and mixed with the pulverized coal for combustion. In an oxy-fired pulverized coal boiler, concentrated oxygen levels are fed into the furnace and mixed with pulverized coal for combustion.

Boiler/piping/turbine thermal masses lend themselves well to the power markets that are capacity and base loaded to maintain operational efficiencies and component lifecycles. However, the current power market is shifting from baseload to cyclic and peak loading brought on by increasing participation of renewable energy sources. The emerging challenge facing many grid systems is grid stability associated with the transient and cyclic electrical production profile of such renewable energy sources. As more and more renewable energy sources are added to the grid, there will be a greater need to operate fossil fuel-fired power plants at low power and improve fast starting to assist in stabilizing the grid.

Currently, large coal-fired plants take 12 to 20 hours from cold to be operating at 80% of their rating. There are at least two main challenges to making large plants more responsive to electrical generation requirements. Namely, when a steam turbine's load is reduced, pressure in the warming system drops in direct proportion to the steam flow. In most steam power plants, the highest feedwater heating is connected to the cold warming system. The cold reheat pressure is directly related to the feedwater temperature at the boiler inlet. Thus, when the cold reheat pressure is reduced, the boiler inlet's feedwater temperature is also reduced. Further, with a reduced reheat pressure, the temperature at the outlet of the hot reheat system drops, resulting in reduced cycle efficiency and longer reheat cycles. Secondly, the temperature cycling of the steam boiler components can impact design lifecycle and tolerances, particularly for components exposed to large temperature variations, e.g., high-pressure steam turbine and piping, superheater configurations, and the like. As a result, it is common to maintain temperatures and the reheat pressure at high levels in the plant to avoid imposing temperature-related stresses on the boiler and turbine components. Therefore, it is desirable to maintain boiler system components at higher temperatures to reduce plant restart, warm-up, and even hot restart cycle times, while reducing stresses on plant components.

BRIEF DESCRIPTION

In an embodiment, a system for warming a steam-driven power generation system is described. The system includes a boiler system, including a main boiler with a combustion system, the boiler system operative to generate steam when the combustion system is operative, and a mixer with an input fluidly coupled to the boiler. The system also includes a plurality of steam pipes, the plurality of steam pipes including a first steam pipe, a second steam pipe, and a turbine having at least a first section of the turbine operable to receive steam. An input to the first section of the turbine is fluidly connected via the first steam pipe to an output of at least one of the boiler, and the mixer and operable to carry steam from the boiler system at a first temperature to the first section of the turbine, wherein an output of the first section of the turbine is fluidly connected to the second steam pipe. The second steam pipe is operable to carry heated steam at a second temperature from an output of the turbine to at least one of an input to the boiler and an input of the mixer. In addition, the system includes a first flow control valve operable to control a flow of steam through the first section of the turbine, a sensor the sensor operable to monitor at least one operating characteristic in the boiler system. The system includes a control unit configured to receive information associated with the monitored operating characteristic and control at least the first flow control valve to control the amount of steam directed through the turbine under selected conditions and when the main boiler system is not generating steam.

In another embodiment, described herein is a method of warming a power generation system, having a boiler system including a main boiler and a mixer, the main boiler operative to generate steam when the combustion system is operating, and the mixer with an input fluidly coupled to the main boiler. The method including operably connecting a flow of steam at a first temperature from the mixer or the main boiler to at least a first section of a turbine operable to receive steam, operably connecting an output of the first section of the turbine to at least one of an input to the boiler and an input of the mixer to carry heated steam at a second temperature therefrom, operably connecting a first flow control valve, the first flow control valve operable to control a flow of steam through the first section of the turbine. The method also includes monitoring at least one operating characteristic in the boiler system, receiving information associated with the monitored operating characteristic with a controller, and controlling at least the flow control valve to control the amount of steam directed through the first section of the turbine under selected conditions when the main boiler system is not generating steam to warm the boiler.

Additional features and advantages are realized through the techniques of the present disclosure. Other embodiments and aspects of the disclosure are described in detail herein.

For a better understanding of the disclosure with the advantages and the features, refer to the description and the drawings.

DRAWINGS

The described embodiments will be better understood from reading the following description of non-limiting embodiments, with reference to the attached drawings, wherein below:

DETAILED DESCRIPTION

Figure 1:
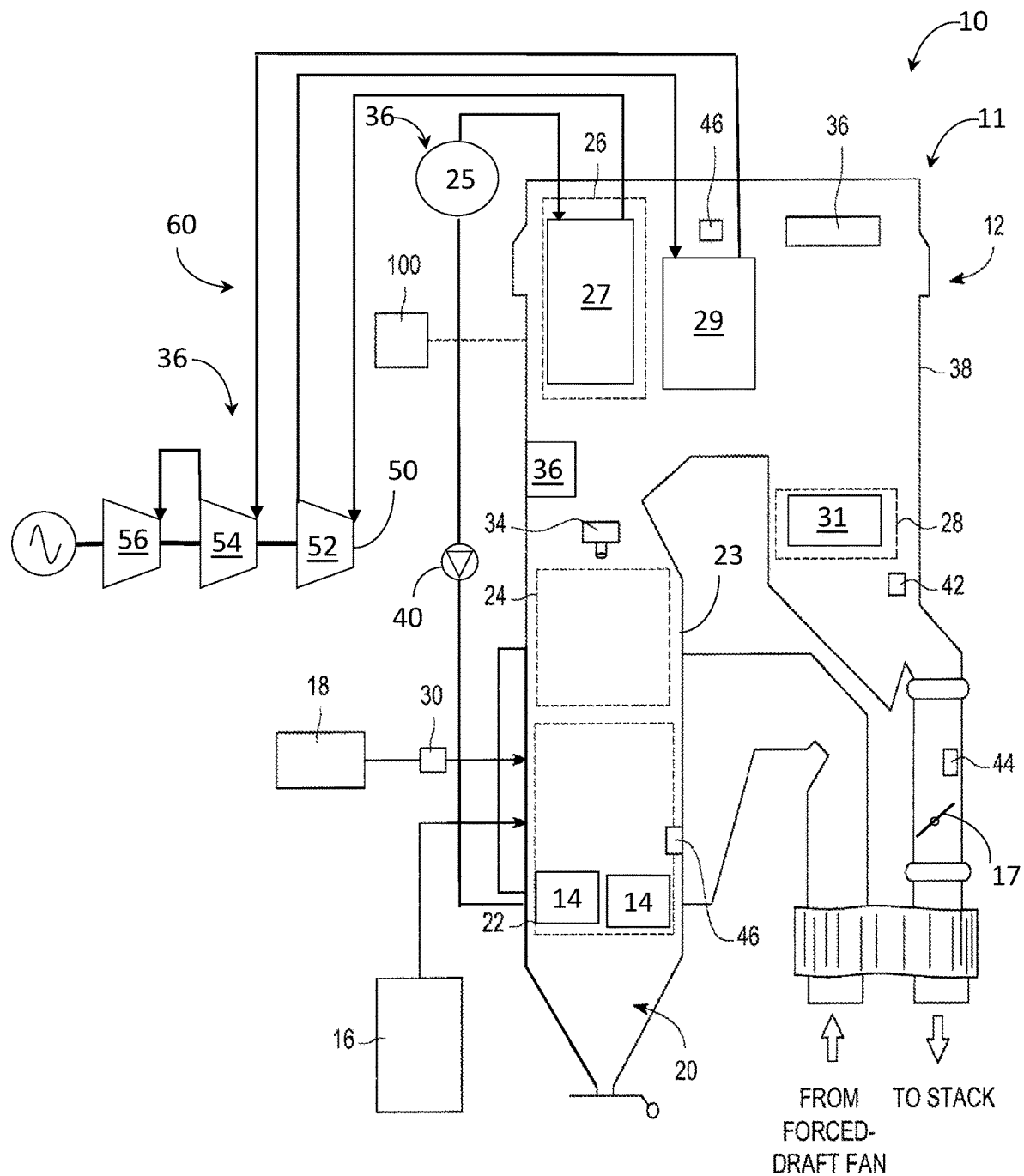
FIG. 1 is a simplified schematic illustration of a power generation system in accordance with an embodiment.

Reference will be made below in detail to exemplary embodiments as described herein, examples of which are illustrated in the accompanying drawings. Wherever possible, the same reference characters used throughout the drawings refer to the same or like parts. While the various embodiments as described herein are suitable for use with heat recovery steam generation systems that include a combustion system, it should be appreciated that such reference is for illustrative purposes and other configurations are possible. For example, in the various embodiments described, a pulverized coal boiler system, such as for use in a pulverized coal power plant, has been selected and described for clarity of illustration, although other types of boiler systems are possible. Other systems may include other types of boilers, furnaces, and fired heaters utilizing a wide range of fuels, including, but not limited to, coal, oil, and gas. For example, contemplated boilers include, but are not limited to, may both T-fired and wall fired pulverized coal boilers, circulating fluidized bed (CFB) and bubbling fluidized bed (BFB) boilers, stoker boilers, suspension burners for biomass boilers, including controlled circulation, natural circulation, and supercritical boilers and other heat recovery steam generator systems.

Embodiments, as described herein, relate to a power generation system with a heat recovery steam generation system, including a combustion system and method and control scheme to improve and reduce startup times in boiler systems. In particular, embodiments are related to a system and method that provides a controlled shut down of the power generation system and boiler and way to pre-warm and sustain warmth in a boiler/turbine/steam piping system when starting a power plant from cold conditions and maintains the pressure/temperature of the boiler/turbine/steam piping when restarting a power plant from hot conditions. Maintaining warmth/pre-warming the boiler system components facilitates a much shorter time to restart the boiler/steam piping/turbine allowing the typical coal-fired power plant to be more responsive to sudden electrical grid demands. Furthermore, in periods of low grid energy demand, e.g., when grid demand is low (renewable energy contribution is high), it may be possible/desirable for some fossil-fueled boilers to be required to reduce the load or even discontinue operation as part of an effort to maintain and balance the electrical grid. In such cases, in accordance with one or more of the described embodiments, instead of cycling coal-fired plants to minimum load, a shutdown process is initiated and carried out with the intention to restart the plant within a span of several hours, e.g., 12 hours up to several days.

Immediately following furnace purge and furnace isolation, the boiler pressures and temperature slowly decay over time. However, the described embodiments include a method and system of slowing, avoiding, and/or recovering from this inevitable decay by providing warming steam via a controlled admittance of steam into the steam drum/boiler. In one embodiment, warming is accomplished with recovering heat generated as a result of turbine ventilation or partial ventilation. In another embodiment, warming may be accomplished with small steam flows from an auxiliary boiler/secondary steam source. Steam is supplied by a smaller auxiliary (aux.) boiler or by a secondary steam source to generate a steam drum (or equivalent) pressure of approximately 28 bar without requiring the main boiler to be fired. In other embodiments, heat energy is stored and recovered from a thermal energy storage system.

FIG. 1 illustrates a power generation system 10, including a heat recovery steam generation system with combustion system 11 having a boiler 12 as may be employed in power generation applications. The boiler 12 may be a tangentially fired boiler (also known as a T-fired boiler) or wall fired boiler. Fuel and air are introduced into the boiler 12 via the burner assemblies 14 and nozzles associated therewith. The combustion system 10 includes a fuel source such as, for example, a pulverizer 16 that is configured to grind fuel such as coal to a desired degree of fineness. The pulverized coal is passed from the pulverizer 16 to the boiler 12 using primary air. An air-source 18 supplies primary and secondary or combustion air to the boiler 12 where it is mixed with the fuel and combusted, as discussed in detail hereinafter. Where the boiler 12 is oxy-fired, the air source 18 may be an air separation unit that extracts oxygen from an incoming air stream or directly from the atmosphere.

The boiler 12 includes a hopper zone 20 located below a main burner zone 22 from which ash can be removed, the main burner zone 22 (also referred to as a windbox) where the air and an air-fuel mixture is introduced into the boiler 12, and a burnout zone 24 where any air or fuel that is not combusted in the main burner zone 22 gets combusted. The boiler also includes a superheater zone 26 with superheater 27 where the combustion flue gases superheats the steam, and an economizer zone 28 with an economizer 31 where water can be preheated prior to entering a steam drum 25 or a mixing sphere (25) to feed water to the waterwall 23. Pump(s) 40 may be employed to aid in circulating preheat water to the waterwall 23 and through boiler 12. Combustion of the fuel with the primary and secondary air within the boiler 12 produces a stream of flue gases that are ultimately treated and exhausted through a stack downstream from the economizer zone 28. As used herein, directions such as "downstream" mean the general direction of the flue gas flow. Similarly, the term "upstream" is opposite the direction of "downstream" going opposite the direction of flue gas flow.

Generally, in the operation of the power generation system 10 and combustion system 11, the combustion of fuel in the boiler 12 heats water in the waterwalls 23 of the boiler 12. The steam then passes through the steam drum (or equivalent), hereinafter referred to as drum 25, to the superheater 27 in the superheater zone 26, where additional heat from the hot flue gases is imparted to the steam. The superheated steam from the superheater 27 is then directed via a steam piping system shown generally as 60 to a high-pressure section 52 of turbine 50, where the steam is expanded and cooled to drive turbine 50 and thereby turn a generator 58 (FIG. 2) to generate electricity. The expanded steam from the high-pressure section 52 of the turbine 50 may then be returned to a reheater 29 downstream from the superheater 27 to warm the steam, which is then directed to an intermediate-pressure section 54 of turbine 50, and ultimately a low-pressure section 56 of the turbine 50 where the steam is successively expanded and cooled to drive turbine 50. Steam is finally condensed in condenser 13, drained to a hotwell (not shown), and recirculated to the boiler 12 to be heated once again.

As illustrated in FIG. 1, the combustion system 11 includes an array of sensors, actuators, and monitoring devices to monitor and control the combustion process and the resulting consequences with respect to low excess air operation. For example, temperature and pressure monitors, shown generally as 36, are employed throughout the system to ensure proper control and operation and ensure that the system and components' operational limits are not exceeded. In another example, the combustion system 11 may include a plurality of fluid flow control devices 30 that supply secondary air for combustion to each fuel introduction nozzle associated with the burner assemblies 14. In an embodiment, the fluid flow control devices 30 may be electrically actuated air dampers that can be controlled and adjusted to vary the amount of air provided to each fuel introduction nozzle associated with each burner assembly 14. The boiler 12 may also include other individually controllable air dampers or fluid flow control devices 30 at various spatial locations around the boiler 12. Each of the flow control devices 30 is individually controllable by a control unit 100 to ensure that desired air/fuel ratios and flame temperature are achieved for each nozzle location.

The combustion system 11 may include a flame scanning device associated with each fuel introduction nozzle or burner assembly 14. The flame scanning devices are configured to assess the local stoichiometry (air/fuel ratio) at each respective the nozzle location within the main burner zone 22. In addition to detecting the respective quantities of air and fuel at each nozzle location, the flame scanning devices are also configured to sense the flame temperature adjacent to each burner assembly 14.

FIG. 1 also illustrates that the backpass 38 of the boiler 12 downstream from the superheater 27, reheater 29, and economizer 31 in economizer section 28 is fitted with a monitoring device 42. The monitoring device 42 is configured for measurement and assessment of gas species such as carbon monoxide (CO), carbon dioxide ($CO_2$), mercury (Hg), sulfur dioxide ($SO_2$), sulfur trioxide ($SO_3$), nitrogen dioxide ($NO_2$), nitric oxide (NO) and oxygen ($O_2$) within the backpass 38. $SO_2$ and $SO_3$ are collectively referred to as SOx. Similarly, $NO_2$ and NO are collectively referred to as NOx.

Continuing with the boiler 12, in operation, a predetermined ratio of fuel and air is provided to each of the burner assemblies 14 for combustion. As the fuel/air mixture is combusted within the furnace and flue gases are generated, the combustion process and flue gases are monitored. In particular, various parameters of the fireball and flame, conditions on the furnace walls, and various flue gas parameters are sensed and monitored. These parameters are transmitted or otherwise communicated to the combustion control unit 100, where they are analyzed and processed according to a control algorithm stored in memory and executed by a processor. The control unit 100, among other things, is configured to control the fuel provided to the boiler 12 and/or the air provided to the boiler 12, in dependence upon the one or more monitored combustion and flue gas parameters and furnace wall conditions.

Furthermore, the power generation system 10 also includes an array of sensors, actuators, and monitoring devices to monitor and control the heating processes associated with the steam generation and warming in accordance with the described embodiments. For example, the power generation system 10 may include a plurality of fluid flow control devices, e.g., 67 (FIG. 2), that control the flow of water or steam in the system 10. In an embodiment, the fluid flow control devices 67 may be electrically actuated valves that can be controlled and adjusted to vary the amount of flow. Each of the flow control devices, e.g., 67, is individually controllable by a control unit 100. The power generation system 10 may also include a plurality of sensors operable to monitor various other operational parameters of the power generation system 10. For example, temperature and pressure sensors 36 may be employed as needed to monitor the operation and effect in numerous parts of the system 10. In an embodiment, the temperature and pressure sensors 36 may each be operably connected to the control unit 100 or another controller as needed to implement the methodologies and functions described herein.

Figure 2:
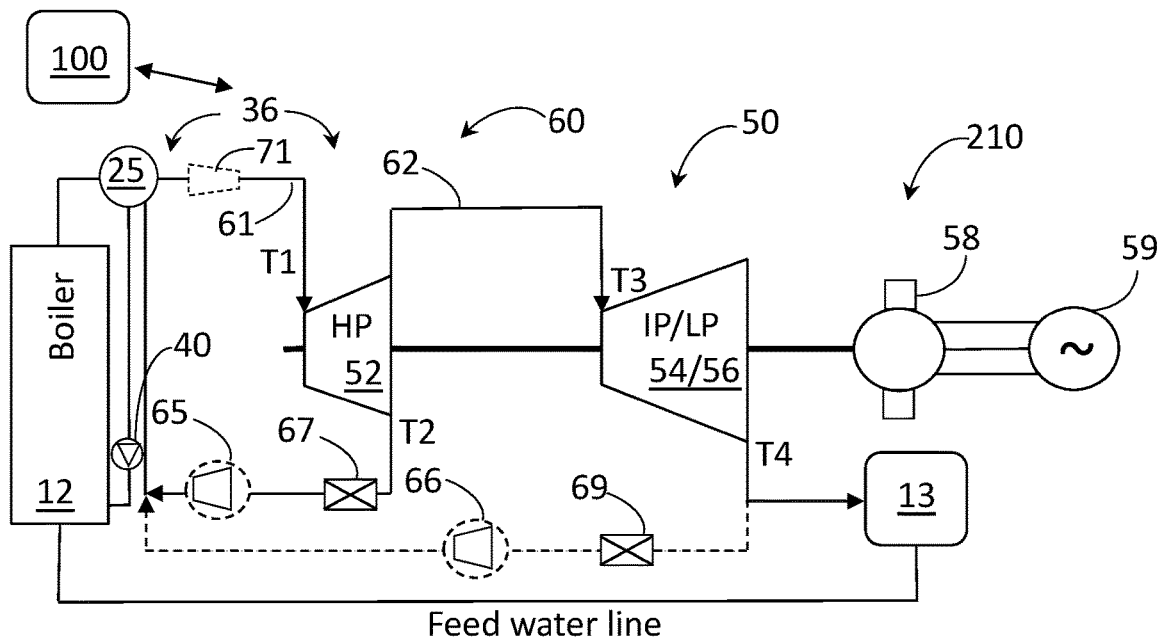
FIG. 2 is a schematic illustration of a boiler of the power generation system of FIG. 1, in accordance with an embodiment.

FIG. 2 depicts a simplified schematic of a system for heat loss reduction and prewarming at least a portion of a power generation system 210 in accordance with an embodiment. The system and associated methodology provide a way to, optionally, reduce heat loss in the boiler 12 and to warm and sustain operational characteristics, including, but not limited to temperature and pressure in at least the turbine 50 and steam piping system 60 interconnecting the boiler 12 when the boiler 12 is inoperative. It may readily be appreciated that when starting the power generation system, now denoted 210, from cold conditions, any prewarming will help reduce the overall warming, steam generation, power generation startup time, hereinafter referred to collectively as startup time. In addition, with the boiler 12 inoperative, each of the components of the power generation system 210 will slowly begin to lose heat to the ambient. The rate of heat loss can vary significantly based on the ambient temperature, exterior temperature, the particular components, as well as how well they are insulated. To that end, naturally, efforts taken to delay and reduce heat loss in the power generation system 210 while the boiler 12 is inoperative will improve the overall recovery capability and thereby startup time.

In an embodiment, a system configuration and methodology are described that provide for improving startup time by reducing heat losses and employing warming steam to maintain the operational characteristics, including, but not limited to, the temperature of the boiler 12, interconnecting steam piping 60, and turbine 50. The described embodiments are operative when the boiler 12 is initially inoperative to facilitate restarting a boiler 12 and power generation system 210. Warming facilitates a quicker restarting of the boiler 12 and, ultimately, the turbine 50, allowing the coal-fired power generation system 210 to be more responsive to sudden electrical grid demands. To address periods of low energy demand on the grid 59 and to maintain balance on the grid 59, some fossil-fueled power plants may be required to reduce the load or even discontinue operation. In the latter case, the described embodiments provide reductions of heat losses and ensure warming steam, thereby heating the boiler 12 and main steam piping, e.g., 60 to the steam turbine 50. Such warming facilitates transitioning the boiler 12 to producing steam more rapidly, thereby transitioning the power generation system 210 to electricity production more rapidly than conventional systems.

In an embodiment, operationally, it should be appreciated that the boiler 12 is shut down and not producing steam. It will be appreciated that an operator may employ various efforts to delay and reduce heat loss in the power generation system 210. For example, once the flue gases have been sufficiently purged, optionally, the circulation pump(s) 40 are stopped/slowed to prevent further heat losses throughout the power generation system 210. Furthermore, damper 17 is optionally employed and closed to avoid further heat losses through draft effects in the combustion system 11. In an embodiment, the damper 17 is selected and configured to provide tight sealing of the exhaust flue of the boiler 12 to minimize draft losses.

Continuing with FIG. 2, during periods of low grid energy demand, when fossil-fueled power plants have reduced load or even discontinued, the described embodiments are employed to warm the power generation system 210. In an embodiment, power is drawn from the grid 59 to power the generator 58 operating as a motor. Pulling power from the grid 59 under such conditions (e.g., low grid demand, high contribution to the grid from renewables, and the like) helps balance and stabilize the grid 59. The generator 58, operating as a motor, turns the turbine 50. Turning the turbine 50 under such conditions is known in some instances as turning or motoring, and may result in the ventilation of some or portions of the turbine stages, which, as a result of the work imparted upon the steam and friction in the turbine, particularly the high-pressure section 52 of the turbine 50, adds heat to the steam in the turbine 50. As a result, in some embodiments, but not all, the temperature T2 downstream of the high-pressure section 52 of the turbine 50 will be higher than the temperature T1 at the inlet to the high-pressure section 52 of the turbine. In addition, there will be a small pressure drop in the high-pressure section 52 of the turbine 50 as the steam expands. In an exemplary embodiment, the heat generated may be captured and utilized to warm/maintain the temperature of the boiler 12. In an embodiment, about 5%-10% for the rating of the power generation system 210 may be generated by turbine ventilation or partial ventilation and employed for heating. However, it should also be appreciated that based on the operating conditions and the mass flow of the steam in the turbine, 50 complete ventilation may not be necessary. In some instances, and selected optional configurations of the system, particularly when auxiliary heaters are employed, as described herein, less work needs be expended in the turbine 50 to facilitate warming/maintaining the boiler 12 at desired temperatures and pressures.

Moreover, in some embodiments, it may be possible for a portion of the turbine 50 or even a portion of a section, e.g., the high-pressure section 52 of the turbine 50 to be in ventilation, while another portion, e.g., the intermediate-pressure section 54 or low-pressure section 56 of the turbine is generating work e.g. to drive the generator 58. For example, when the steam turbine exhibits mass flows below 10% of the nominal (e.g., normal operation), the pressure drop across the turbine 50 reduces. This reduction in pressure drop makes available a significant amount of heat at the outlet of the high-pressure turbine 52.

Continuing with FIG. 2, in an embodiment, as the turbine 50 is spun by the generator 58, steam in the steam pipe 61 and high-pressure section 52 of the turbine is warmed or at least additional energy is absorbed by virtue of the work imparted by the turbine 50. The heated steam is then directed back to the mixer 25 and boiler 12. In an embodiment, the temperature(s) and pressure(s) entering and leaving the high-pressure section 52 of the turbine 50 are monitored by sensors 36 and directed to the control unit 100 to aid in the control. One or more of the circulation pumps 40 may be operated to ensure mixing and circulation of water through the boiler 12 and drum 25. In embodiments with other boiler types, including natural circulation boilers, a small auxiliary circulation pump 40 may be incorporated to aid in the water circulation in the waterwall 23 of the boiler 12.

In an embodiment, a flow control valve 67 is employed to control the heating/cooling of the turbine 50 by directing the flow of more or less steam through the high-pressure section 52 of the turbine 50. In an embodiment, the steam may be heated by the high-pressure section 52 of the turbine 50 to a target temperature of about 450° C., but not to exceed the temperature limits of the blades of the high-pressure section 52 of the turbine 50. In an embodiment, the not to exceed temperature for the high-pressure section 52 of the turbine 50 is about 485° C. The heating of the steam in the high-pressure section 52 of the turbine 50 is directly controlled by the mass flow going through it. In cases where the steam temperature approaches the maximum allowable, flow control valve 67 is adjusted to direct additional steam to the high-pressure section 52 of the turbine 50 (thereby cooling it). Temperature measurements are made at the inlet and outlet to the high-pressure section 52 of the turbine 50. Control unit 100 monitors the temperatures and pressures, and it adjusts the flow of steam via a flow control valve 67 to control the warming of the boiler and yet ensure protect the turbine 50 from exceeding high-temperature limitations.

In an embodiment, the heated steam is sparged with the water in the mixer/drum 25. The heated steam heats the water in the boiler 12 to maintain the temperatures and pressures in the boiler 12. In addition, some of the higher temperature steam passes to the intermediate-pressure section 54 and then low-pressure section 56 of the turbine 50 to ensure that design temperatures limitations are adhered to for the intermediated pressure section 54 and low-pressure section 56 of the turbine. Optionally some of the heating from these sections may also be captured to facilitate heating of the boiler 12 as described herein. Ultimately the remaining steam passes to the condenser 13 and on to the hot well (not shown) to be recirculated in the boiler 12. In yet another embodiment, optionally, a flash tank 71 may be employed to separate saturated steam from high pressure hot water from the boiler 12 and/or the mixer 25 to be directed to the turbine 50 for warming in instances where there is indirect mixing of the heated steam from the turbine in the mixer 25. Hot condensate/water drains to the mixer 25 for heating the boiler 12. Pump 40 facilitates circulating the heated water in the mixer 25 to the boiler 12 and aids in warming the boiler 12.

It will be appreciated that while the examples provided are described with respect to a controlled circulation boiler, such descriptions are merely illustrative. Other configurations for the boiler 12 as are employed in steam generation heat recovery systems are possible, including, but not limited to, natural circulation boilers and supercritical boilers. For example, in application to once-through boilers (since they do not have any drum), the hot steam injection coming from the turbine 50 may take place at a waterwall inlet or similar locations. The effect is similar to a steam injection in a drum.

Continuing with FIG. 2, in an embodiment, steam from the outlet of the high-pressure section 52 of the turbine 50 may have lost sufficient pressure that it may be desirable to compress the steam to achieve higher pressures and temperatures to aid in the sparging/mixing for warming and maintaining temperatures and pressures for the boiler 12 and mixer 25. In addition, the mixer 25 and boiler 12 are generally at a higher pressure than the outlet side of the high-pressure section 52 of the turbine 50. To that end, in an embodiment, an electrically driven compressor 65 may be employed and controlled by the control unit 100 to pressurize the heated steam, heating it further, and increasing its pressure as needed to facilitate mixing in the mixer 25. The increase in temperature and pressure aid in maintaining targeted pressures in the mixer 25 and boiler 12. In an embodiment, the compressor 65 increases the pressure to slightly higher than the current pressure in the drum 25, with a temperature somewhat higher than the corresponding saturation temperature experienced by the water in the drum 25. To facilitate such control, the temperature and pressure in the drum 25 are monitored with sensors 36 that are operably connected to the control unit 100. In an embodiment, the compressor increases the pressure to a target drum pressure of exceeding the drum pressure of 28 bar psi with a targeted temperature increase in excess of the saturation for the steam at that pressure. It should be appreciated that the target pressure and temperature may vary depending on where the steam is injected. It will be readily appreciated that the operation of the electrically driven compressor 65 is advantageous in another way in that it provides for further balance and stabilization on the grid 59. In examples where indirect mixing is employed, the target pressure and temperature would be based on the difference between flow and the component limitation in the system 210.

In another embodiment, as a result of the work imparted upon the steam and friction in the turbine in the high-pressure section 52 of the turbine 50, optionally, some of the heated steam is directed to the intermediate-pressure section 54 and even optionally, the low-pressure section 56 of the turbine 50. As a result of the continued ventilation in the intermediate-pressure section 54 of the turbine 50, heat is also added to the steam in the turbine 50. As a result, the temperature T4 downstream of the intermediate-pressure section 54 of the turbine 50 will be higher than the temperature T3 at the inlet to the intermediate-pressure section 54 of the turbine 50. In addition, there will be a small pressure drop in the intermediate-pressure section 54 of the turbine 50 as the steam expands. In an exemplary embodiment, the heat generated may be captured and utilized to warm/maintain the temperature of the boiler 12. In an embodiment, the steam may be heated by ventilation of the intermediate-pressure section 54 of the turbine 50 to a target temperature of about 350° C., but not to exceed the temperature limits of the blades of the intermediate-pressure section 54 of the turbine 50. In an embodiment, the not to exceed temperature for the intermediate-pressure section 54 of the turbine 50 is about 400 C.

Furthermore, in yet another embodiment, steam from the intermediate-pressure section 54 of the turbine 50 may have lost sufficient pressure that it may be desirable to compress the steam to achieve higher pressures and temperatures to aid in the sparging/mixing for warming and maintaining temperatures and pressures for the boiler 12 similar to that described for the high-pressure section 52. To that end, in an embodiment, an electrically driven compressor 66 may be employed and controlled by the control unit 100 to pressurize the heated steam from the intermediate-pressure section 54 of the turbine 50, heating it further, and increasing its pressure. The increase in temperature and pressure aid in maintaining targeted pressures in the mixer 25 and boiler 12. In an embodiment, the compressor 66 increases the pressure to slightly higher than the current pressure in the drum 25, with a temperature somewhat higher than the corresponding saturation temperature experienced by the water in the drum 25. To facilitate such control, the temperature and pressure in the drum 25 are monitored with sensors 36 that are operably connected to the control unit 100. In an embodiment, the compressor 66 increases the pressure to a target pressure as described herein with a targeted temperature increase at least the saturation temperature associated with the target pressure, as described herein. It will be readily appreciated that the operation of the electrically driven compressor 66 is advantageous in that it provides for further balance and stabilization on the grid 59. In an embodiment, the flow control valve 69 is employed to control the heating/cooling of the turbine 50 by directing the flow of more or less steam through the intermediate-pressure section 54 of the turbine 50. In an embodiment, the steam may be heated by ventilation of the intermediate-pressure section 54 of the turbine 50 to a target temperature of about 350° C., but not to exceed the temperature limits of the blades of the high-pressure section 54 of the turbine 50. In an embodiment, the not to exceed temperature for the intermediated pressure section 52 of the turbine 50 is about 385° C.

In yet another embodiment, optionally, while the high-pressure section 52 of the turbine 50 operates in ventilation or partial ventilation, steam is directed to the intermediate-pressure section 54 and even optionally, the low-pressure section 56 of the turbine 50. In this instance, the steam is employed to drive the intermediate-pressure section 54 and/or low-pressure section 56 and thereby provides the work needed to drive the generator 58. As a result of the continued ventilation in the high-pressure section 52 of the turbine 50, heat is also added to the steam in the turbine 50, while simultaneously providing motive power for at least the turbine. As a result, in this instance, the temperature T4 downstream of the intermediate-pressure section 54 of the turbine 50 will be lower than the temperature T3 at the inlet to the intermediate-pressure section 54 of the turbine 50. In addition, there will be a pressure drop in the intermediate-pressure section 54 of the turbine 50 as the steam expands, providing work. In an exemplary embodiment, the power generated may be captured and utilized to drive the turbine 50 to support the ventilation, or partial ventilation of the high-pressure section 52 of the turbine 50 and/or to drive the generator 58 and direct a small amount of power to the grid. For example, if an auxiliary heater 70 (FIG. 3) is employed, there may be there excess heat available for the heating of the boiler 12, such that some of the steam generated may be employed in the turbine 50.

To facilitate such control, the temperature and pressure in the system 210 are monitored with sensors 36 that are operably connected to the control unit 100. In an embodiment, at least the flow control valves 67 and 69 may be employed to control the heating/cooling of the turbine 50 by directing permitting the flow of more or less steam through the high-pressure section 52 of the turbine 50 for ventilation, and through the intermediate-pressure section 54 of the turbine 50 for ventilation and/or power generation. In contrast, the generator 58 may be controlled to operate as a generator or a motor. Once again, it will be appreciated that as described herein, the high-pressure section 52 of the turbine 50 is employed for ventilation, while the intermediate-pressure section 54 and low-pressure section 56 are employed for ventilation or power generation. Such a description is merely illustrative, and the system configuration is not so restrictive, any section of the turbine 50 could be employed for ventilation, and any other section could be utilized for power generation or ventilation if desired. That is, for example, the high-pressure section 52 of the turbine 50 could be employed for power generation or ventilation, while the intermediate-pressure section 54 of the turbine is employed for ventilation.

Figure 3:
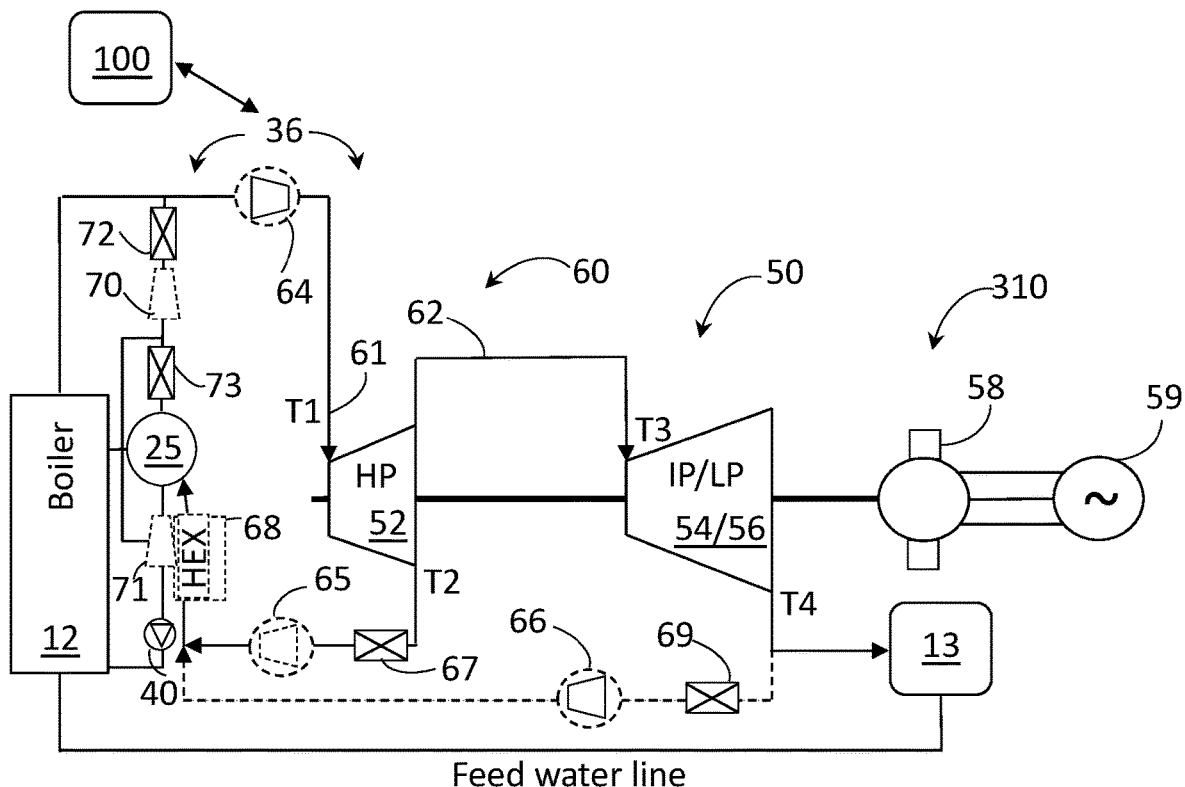
FIG. 3 is a schematic illustration of a boiler of the power generation system of FIGS. 1 and 2, in accordance with an embodiment.

Turning now to FIG. 3 as well, FIG. 3 depicts another simplified schematic of a system for heat loss reduction and prewarming at least a portion of a power generation system 310 in accordance with an embodiment. The system 310 is the same as that described with respect to system 210 of FIG. 2, except that additional components are included in the following embodiments. Once again, the system 310 and associated methodology provide a way to, optionally, reduce heat loss in the boiler, 12 and to warm and sustain operational characteristics, including, but not limited to, temperature and pressure in at least the turbine 50 and steam piping system 60 interconnecting the boiler 12. In an embodiment, a system configuration and methodology are described to reduce heat losses and employ warming steam to maintain the operational characteristics, including, but not limited to, the temperature of the boiler 12, interconnecting steam piping 60, and turbine 50. The described embodiments are operative when the boiler 12 is initially inoperative and not producing steam to facilitate restarting the boiler 12 and power generation system 310. Warming facilitates a quicker restarting of the boiler 12 and, ultimately, the turbine 50, allowing the coal-fired power plant to be more responsive to sudden electrical grid demands.

Once again, in an embodiment, the boiler 12 is shut down and not generating steam. It will be appreciated that an operator may employ various efforts to delay and reduce heat loss in the power generation system 310, as described herein. In an embodiment, once again, power is drawn from the grid 59 to power the generator 58 operating as a motor as described herein, turning the turbine 50 and generating heat therein as described herein. In an exemplary embodiment, the heat generated in the turbine 50 may be captured and utilized to warm/maintain the temperature of the boiler 12. In an embodiment, the heated steam from the turbine 50 is then directed to the optional compressor 65 to exchange its heat back to water and steam in the mixer drum 25 and subsequently recirculated to the turbine 50 to be warmed. A flash tank 71 may be employed to separate saturated steam from high pressure hot water from the boiler 12 and/or the mixer 25 to be directed to the turbine 50 for warming in instances where there is indirect mixing of the heated steam from the turbine in the mixer 25. Hot condensate/water drains from the flash tank 71 directly to the boiler 12 via an auxiliary pump 40. Pump 40 facilitates circulating the heated water from the flash tank 40 to the boiler 12 and aids in warming it up.

In another embodiment, the heated steam from the turbine 50 is then directed to a heat exchanger 68 to exchange its heat back to water from the mixer 25. In particular, the heat exchanger 68 is configured to exchange heat with the water and steam in the mixer 25. In this case, since the heated steam from the high-pressure section 52 of the turbine 50 is not directly mixed with the water in the mixer drum 25 the optional compressor 65 may be needed to increase the pressure between the output of the turbine high-pressure section 52 and the mixer 25 outlet. The hot steam from the turbine is routed to the heat exchanger 68, which warms the water into the mixer 25 and then flows back to turbine. Once again a flash tank 71 may be employed to separate saturated steam from the mixer 25 to be directed to the turbine 50 for warming. The steam from the mixer 25 can be used as a make up and mixed up with the steam coming from the heat exchanger 68. To avoid back flow to the mixer 25, a non-return valve 73 is employed.

In yet another configuration, the heat exchanger 68 may be installed and operable to exchange heat with the downtube of the boiler 12, thereby exchanging heat via heat exchanger 68 with the boiler water in the downtube which is then circulated via pump 40. As described above, the cooled steam may then be directed via the mixer 25 to be recirculated to the turbine 50 to be heated again. Once again, in some embodiments, a flash tank 71 may be employed to separate saturated steam from the mixer 25 to be directed to the turbine 50 for warming. The role of the flash tank for this specific configuration is the same as described above with respect to the previous configuration. In yet another optional embodiment, compressor 64 may also be installed downstream of the heat exchanger 68 and the mixer 25 to add pressure to the now cooled steam as it is redirected to the turbine 50 to be warmed, or a different optional compressor 64 or 65 may be employed depending upon the configuration of the system 310.

Once again, warming is targeted to pressurize the high-pressure section 52 of the turbine 50 and provide desirable target high temperatures out of the turbine 50 to facilitate the warming of the boiler 12 and facilitate a warm/hot startup of the boiler 12 and ultimately the turbine 50. This threshold pressure depends on plant-specific characteristics since the amount of steam flow needed to achieve targeted heating in the high-pressure section 52 of the turbine 50 depends on the initial temperatures, pressures, turbine geometry, and materials and the like. In an embodiment, the targeted heating in the turbine 50 is 450° C., while the pressure from the compressor is selected to be just higher than the pressure in the drum 25. In an embodiment, the targeted drum pressure is about 28 bar, though other pressures are possible depending on the design constraints of the system. The heat exchanger 68 can be of any configuration suitable for the exchange of heat between the heated compressed steam and the mixer 25. It should be appreciated that employing heat exchanger 68 adds flexibility in the configuration of the system for warming in that pressure between the output of the high-pressure section 52 of the turbine and the mixer 25 need not be addressed. That is, the heat exchanger 68 facilitates permitting a pressure difference between the two. Likewise, heat exchanger 68 may readily be employed to directly heat the water in the boiler 12 as described herein.

Continuing with FIG. 3, in yet another embodiment, the heated steam from the high-pressure section 52 of the turbine 50 is directed to the mixer 25 as described herein. In addition, an electric heater 70 may be employed in addition to, or as an alternative, to further heat the water/steam in the mixer 25 and/or optional flash tank 71 depending on the configuration employed. In some configurations a flash tank 71 may not be needed for steam separation. Moreover, in some configurations particularly in instances of low or partial heating from the turbine the auxiliary heater may be advantageous to increase the temperature of the steam to be supplied to the high-pressure section 52 of the turbine.

In an embodiment, the steam may be heated by the high-pressure section 52 of the turbine 50 to a target temperature of 450° C., but not to exceed the temperature limits of the blades of the high-pressure section 52 of the turbine 50. In an embodiment, the not to exceed temperature for the high-pressure section 52 of the turbine 50 is about 485° C. In an embodiment, the steam may be heated by the auxiliary heater 70, and/or optional compressor 64 to a target temperature of 450° C., but once again not to exceed the temperature limits of the blades of the high-pressure section 52 of the turbine 50. In an embodiment, the not to exceed temperature for the high-pressure section 52 of the turbine 50 is about 485° C. The actual target temperatures and pressures may vary depending on the design and configuration of the system. For example, the temperatures may depend on the location of the auxiliary heater 70 (if employed). In the case of auxiliary heater 70 is on the exhaust or outlet side of the high-pressure section 52 of the turbine 50, then target temperatures of 500° C.-550° C. "nominal design temperature of the unit." There need be any additional constraint about blades because it is located downstream. However, in an embodiment where the auxiliary heater 70 is located before the inlet to the high-pressure section 52 of the turbine 50, then 450° C. is employed as a target to ensure that turbine design constraints are not exceeded. In an embodiment, the auxiliary heater may be employed in addition to or in the alternative to the full ventilation of the turbine 50. For example, depending on the design and construction of a given power generation system 310, including the boiler 12 and turbine, and the losses in the steam pipes 60, varying amounts of added heat may be sufficient to maintain the desired temperatures and pressures in the boiler. Under such conditions, reduced heating from the turbine 50 may be sufficient. In yet another embodiment, compressor 64 may be employed between the boiler 12 and the auxiliary heater 70 and the input to the high-pressure section 52 of the turbine 50. In this embodiment, the compressor 64 may be employed to ensure that the pressure of the steam being directed to the high-pressure section 52 of the turbine 50 is of sufficient pressure and temperature for driving the turbine under selected conditions.

Figure 4:
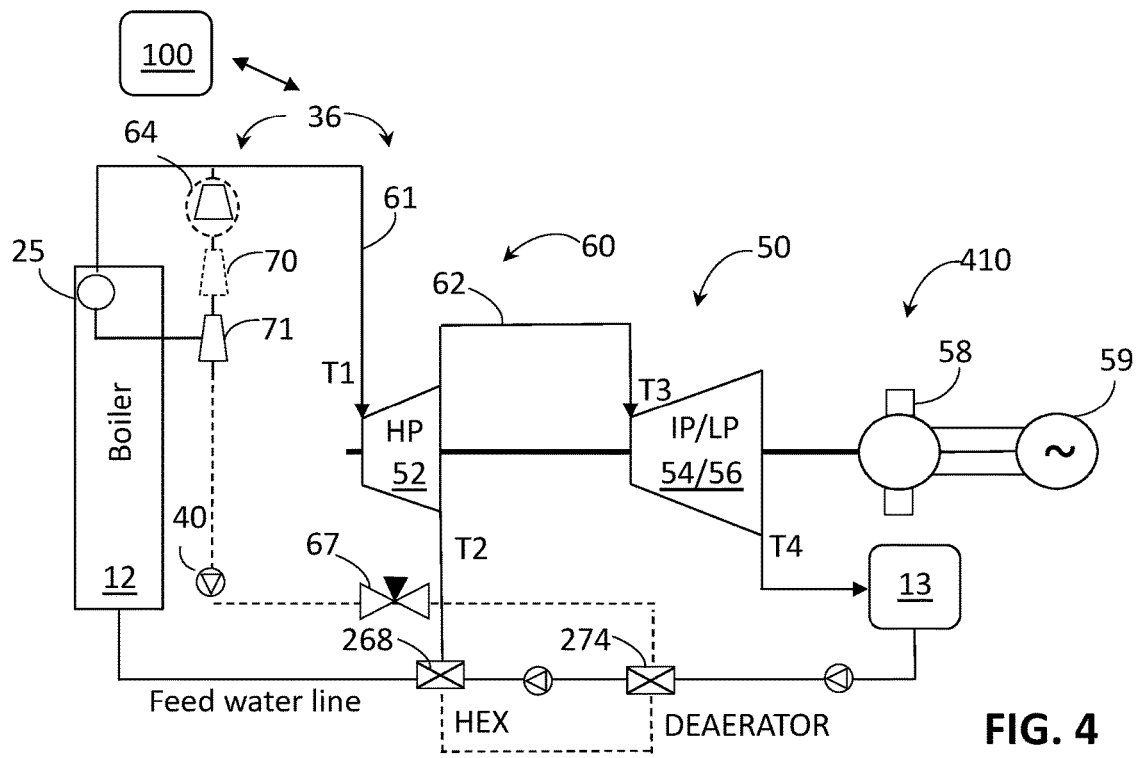
FIG. 4 is a schematic illustration of a boiler of the power generation system in accordance with another embodiment.

FIG. 4 depicts another simplified schematic of a system for heat loss reduction and prewarming at least a portion of a power generation system, now denoted as 410 in accordance with an embodiment. The system is similar as described with respect to FIGS. 2 and 3, once again with varied or additional components and features. In an embodiment, a system configuration and methodology are described to reduce heat losses and employ warming steam to maintain the operational characteristics, including, but not limited to, the temperature of the boiler 12, interconnecting steam piping 60, and turbine 50. The described embodiments are operative when the boiler 12 is initially inoperative and not producing steam to facilitate restarting the boiler 12 and thereby, the power generation system 410. Warming facilitates quicker restarting of the boiler 12 and, ultimately, the turbine 50, allowing the power plant to be more responsive to sudden electrical grid demands.

Once again, in an embodiment, the boiler 12 is shut down and not generating steam. In an embodiment, once again, power is drawn from the grid 59 to power the generator 58 operating as a motor as described herein, turning the turbine 50 and generating heat as described herein. In one illustrative embodiment, the heat generated may be captured and utilized to warm/maintain the temperature of the boiler 12. In an embodiment, the heated steam from the turbine 50 (in this instance, the high-pressure section 52, though not necessarily) is then directed to heat exchanger 268 (for this embodiment), thereby exchanging heat with the feedwater to the boiler 12. The cooled steam from the heat exchanger 268 may also be used to warm and deaerate the water in deaerator 274 of the feed water line and condensate from the condenser 13 as described previously herein. Furthermore, in an embodiment, again as with other embodiments, steam passes through the optional compressor 65 (FIG. 3) and through a heat exchanger 68 to exchange its heat back to the mixer 25 and boiler 12 to provide warming to the boiler 12 and mixer 25. In this case, since the heated steam from the high-pressure section 52 of the turbine 50 is not directly mixed with the water in the mixer drum 25, the compressor 65 is optional and may not be needed to equalize the pressure between the turbine high-pressure section 52 and the mixer 25.

Continuing with FIG. 4, in yet another embodiment, a flash tank 71 may be employed to separate saturated steam from high pressure hot water from the boiler 12 and/or the mixer 25 to be directed to the turbine 50 for warming in instances where there is direct mixing of the heated steam from the turbine in the mixer 25. In addition, as described with respect to earlier embodiments an optional electric heater 70 and/or compressor, e.g., 64 may be employed in addition to, or as an alternative, to heat and/or increase the pressure of the steam from the flash tank 71. Hot condensate/water drains to the deaerator 274 for heating the boiler 12 feed water as described. Condensate from the flash tank 71 is directed to the deaerator 274 to join the feedwater for warming and repetition of the heating cycle. A small circulation pump 40 may be employed in an embodiment to facilitate circulation for water for warming. The heated steam is directed to the high-pressure section 52 of the steam turbine 50. In an embodiment, the steam may be heated by the high-pressure section 52 of the turbine 50 to a target temperature of 450° C., but not to exceed the temperature limits of the blades of the high-pressure section 52 of the turbine 50 as described herein with respect to the earlier embodiments. Control valves, including but not limited to valve 67 provides for control of the flow of steam through the deaerator 274 as well as providing isolation during normal operation of the boiler 12.

Figure 5:
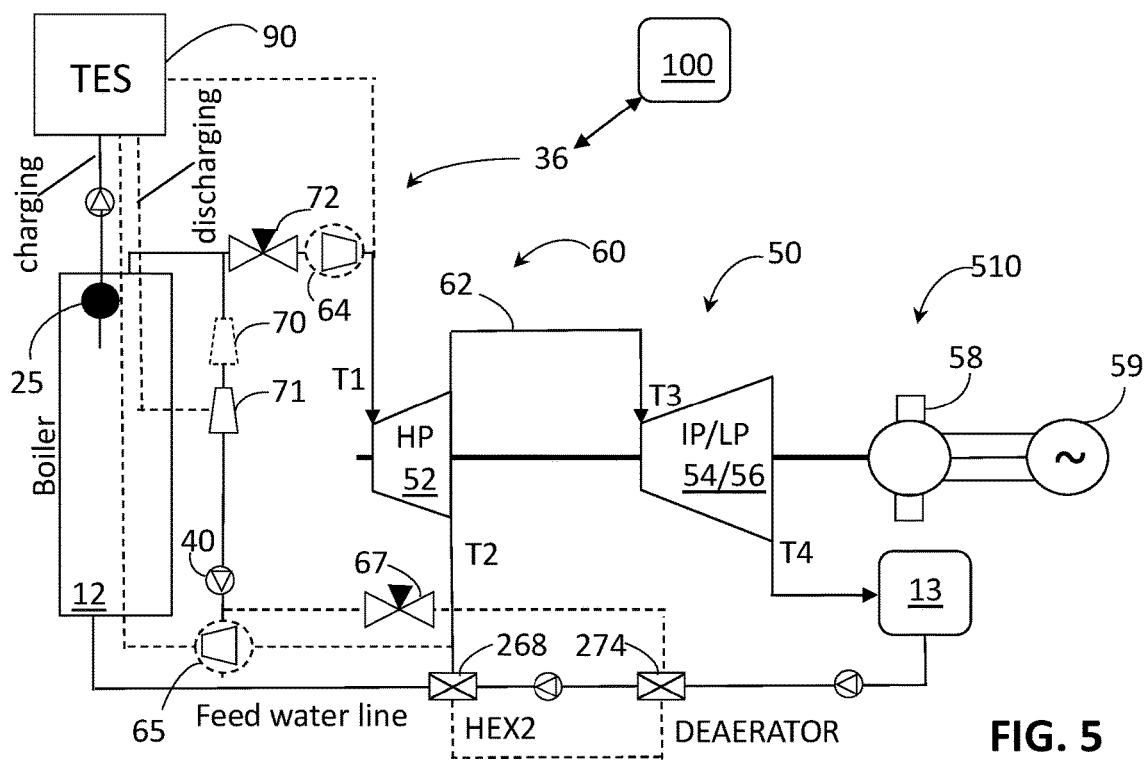
FIG. 5 is a schematic illustration of a boiler of the power generation system in accordance with yet another embodiment.

FIG. 5 depicts another simplified schematic of a system for heat loss reduction and prewarming at least a portion of a power generation system, now denoted as 510 in accordance with an embodiment. The system 510 is the same as that described with respect to FIGS. 2, 3, and 4 once again with varied or additional components and features. Once again, the described embodiments are operative when the boiler 12 is initially inoperative and not producing steam to facilitate restarting the boiler 12, thereby creating the power generation system 510. In one illustrative embodiment, the heat generated by the turbine 50 or other sources may be captured and utilized to warm/maintain the temperature of the boiler 12 and reduces either auxiliary heating or discharge from thermal energy storage 90. In addition, in an embodiment, a thermal energy storage system 90 may be employed to facilitate warming or to maintain the temperature of the boiler, steam pipes 60, turbine 50, and the like. In an embodiment, the thermal energy storage system 90 may include, but not be limited to, any form of heat or energy storage such as water, molten salt, phase change materials, and the like. In one embodiment, a molten salt-based thermal energy storage system is envisioned. In an embodiment, the thermal energy storage system 90 may be configured to operate in two modes. First, a charging or storage mode, and second a discharging or supply mode. In the charging mode, heated steam from various sources such as the turbine, auxiliary heaters 70 or compressor 64, or even sources outside the system 510, and the like, is directed to the thermal energy storage 90, while in the discharge mode, heat is extracted from the thermal energy storage 90 to provide heating for the boiler 12, steam piping 60, turbine 50, and the like to maintain heating. In an embodiment, the discharging time of the thermal energy storage system 90 can be reduced as a function of the heat provided by the turbine under low load operation. For example, the heat provided by the turbine at a low load can be used to reduce the discharging time of the thermal energy storage system. In an embodiment, the physical dimensions of the thermal energy storage system 90 can be a function of the heat provided by the turbine under the low load operation. For example, the use of the heat provided by the turbine under the low load operation can reduce the physical dimensions of the thermal energy storage system.

In an embodiment, during regular operation of the boiler 12, steam may be directed to the thermal energy storage system 90. When the boiler 12 is inoperative, as described earlier, steam from the turbine 50 (in this instance, the high-pressure section 52, though not necessarily) is directed to heat exchanger 268 (for this embodiment), thereby exchanging heat with the feedwater to the boiler 12 as described earlier. In addition, heated steam may be directed to or received from the thermal energy storage system 90 for application heating the boiler 12, steam piping 60, and turbine 50.

In yet another embodiment, steam from the thermal energy storage system may be directed to the high-pressure section 52 of the turbine 50 for heating. In another embodiment a flash tank 71 may be employed to separate saturated steam from high pressure hot water from the boiler 12 and/or the mixer 25 or the thermal energy storage system 90, flashed to steam at lower pressure and then directed to the turbine 50 for warming. In addition, in another embodiment, as described with respect to earlier embodiments, an optional auxiliary heater 70, for example an electric heater, may be employed in addition to, or as an alternative, to heat the steam from the flash tank 71 or the thermal energy storage system 90. Hot condensate/water drains to the deaerator 274 for heating the boiler 12 feed water as described. Condensate from the flash tank 71 is directed to the deaerator 274 to join the feedwater for warming and repetition of the heating cycle. A small circulation pump 40 may, optionally, be employed in an embodiment to facilitate circulation for water for warming in the feed water line, though it is not required or operation. The heated steam from the turbine 50 heats the water in the boiler 12 to maintain the temperatures and pressures in the boiler 12 as described herein. In an embodiment, the steam may be heated by the high-pressure section 52 of the turbine 50 to a target temperature of 450° C., but not to exceed the temperature limits of the high-pressure section's blades 52 of the turbine 50 as described earlier.

Furthermore, the optional compressor(s) e.g., 64, 65 may be employed to increase the pressure of heated steam to/from the high-pressure section 52 of the turbine 50 to also provide heated steam to the thermal energy storage system 90. Likewise, optional compressor 64 may be employed under selected conditions to increase pressures as steam is directed to the turbine 50. For example, when the heat is provided by the thermal energy storage system 90 or the auxiliary heater 70. As described earlier, isolation valves 67 and 72 provide for isolation under selected conditions, and when the boiler 12 is operating normally.

Figure 6:
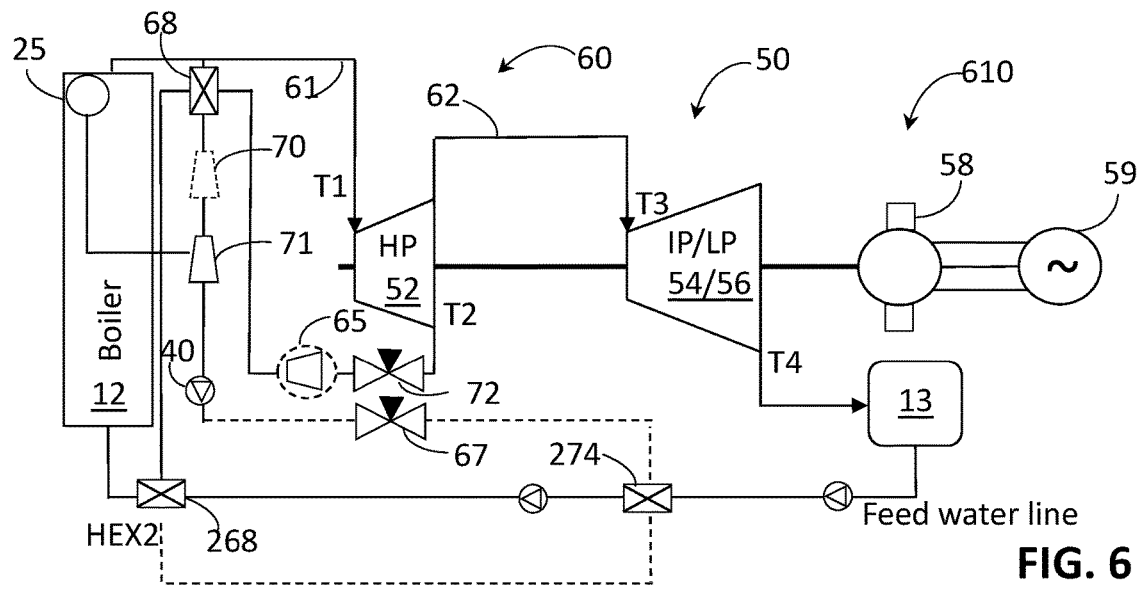
FIG. 6 is a schematic illustration of a boiler of the power generation system in accordance with a further embodiment.

Turning now to FIG. 6 as well. FIG. 6 depicts another simplified schematic of a system for heat loss reduction and prewarming at least a portion of a power generation system, now denoted as 610, in accordance with an embodiment. The system 610 is the same as that described with respect to FIGS. 2-5, once again, with varied or additional components and features. In one illustrative embodiment, heated steam from the turbine 50 (in this instance, the high-pressure section 52, though not necessarily) is then directed to heat exchanger 68 (for this embodiment), thereby exchanging heat with the steam from the boiler 12 and mixer 25 to the turbine. Furthermore, in an embodiment, again, the optional compressor 65 may be employed to equalize the pressure between the turbine high-pressure section 52 and the mixer 25. Furthermore, in this case, since the heated steam from the high-pressure section 52 of the turbine 50 is not directly mixed with the water in the mixer drum 25, the compressor 65 is optional and may not be needed. The cooled steam from the heat exchanger 68 may also be used to preheat and deaerate the water in heat exchanger 268 and then deaerator 274 of the feed water line and condensate from the condenser 13 as described previously herein. Advantageously, this embodiment employing heat exchanger 68 and 268 isolates the reheating functions from the boiler 12 and avoids the need to match temperatures and pressures.

Continuing with FIG. 6, in another embodiment a flash tank 71 may be employed to separate saturated steam from high pressure hot water from the boiler 12 and/or the mixer 25, flashed to steam at lower pressure and then directed through the heat exchanger 68, heated and directed to the turbine 50 for warming. In another embodiment, once again an optional auxiliary heater 70, such as, but not limited to an electric heater and or compressor 65 may be employed in addition to, or as an alternative, to heat steam from the turbine 50 and heat exchanger 68 to further heat the water/steam in the boiler 12 and mixer 25 to further heat the water/steam in the mixer 25 and/or optional flash tank 71 depending on the configuration employed. In some configurations as described above, a flash tank 71 may not be needed for steam separation. Moreover, in some configurations particularly in instances of low or partial heating from the turbine the auxiliary heater 70 may be advantageous to increase the temperature of the steam to be supplied to the high-pressure section 52 of the turbine. Finally, condensate from the flash tank 71 is directed to the deaerator 274 to join the feedwater for warming and repetition of the heating cycle. A small circulation pump 40 may, optionally, be employed in an embodiment to facilitate circulation for water for warming, but is not needed for all applications. Valves 67 and 72 provide for isolation of the warm functions during normal operation of the boiler 12.

The heated steam heats the water in the boiler 12 to maintain the temperatures and pressures in the boiler 12. In an embodiment, the steam may be heated by the high-pressure section 52 of the turbine 50 to a target temperature of 450° C., but not to exceed the temperature limits of the blades of the high-pressure section 52 of the turbine 50 as previously discussed.

Figure 7:
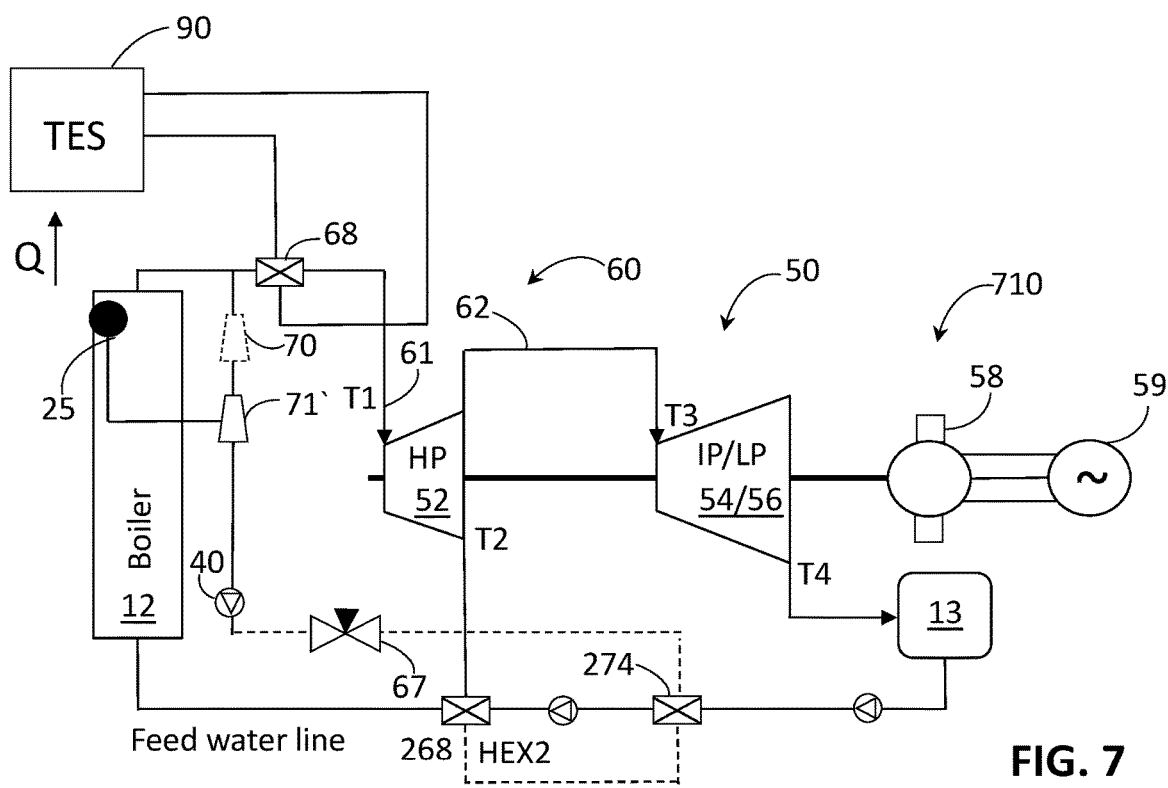
FIG. 7 is a schematic illustration of a boiler of the power generation system in accordance with an embodiment.

The actual target temperatures and pressures may vary depending on the design and configuration of the system 610. For example, the temperatures may depend on the location of the auxiliary heater 70 (if employed). In an embodiment, the auxiliary heater 70 may be employed in addition to or in the alternative to the partial or full ventilation of the turbine 50. For example, depending on the design and construction of a given power generation system 610, including the boiler 12 and turbine 50, and the losses in the steam pipes 60, varying amounts of added heat may be sufficient to maintain the desired temperatures and pressures in the boiler 12. Under such conditions, reduced heating from the turbine 50 may be sufficient FIG. 7 depicts another simplified schematic of yet another embodiment of a system for heat loss reduction and prewarming. The system 710 is the same as that described with respect to FIGS. 2-6 once again with varied or additional components and features with particular similarity to FIGS. 5 and 6. In this embodiment, the heat generated by the turbine 50 or other sources may be captured and utilized to warm/maintain the temperature of the boiler 12 and reduces either auxiliary heating or discharge from thermal energy storage 90 similar to that described with respect to FIG. 5.

In an embodiment, during normal operation of the boiler 12, heat may be directed to the thermal energy storage system 90 either from external sources or via heat exchanger 68. Likewise, when the boiler 12 is inoperative, heat from the thermal energy storage system 90 is directed back to the boiler 12 and high-pressure section 52 of the turbine 50 as described earlier. Heated steam from the turbine 50 is directed to heat exchanger 268, thereby exchanging heat with the feedwater to the boiler 12 as described previously. In one embodiment, a flash tank 71 may be employed to separate saturated steam from high pressure hot water from the boiler 12 and/or the mixer 25, flashed to steam at lower pressure and then directed through the heat exchanger 68, heated further by the thermal energy storage system 90, and the directed to the turbine 50 for reheating. Once again, an optional auxiliary heater 70 may also be employed in addition to, or as an alternative, to provide additional heating to steam from the flash tank 71 and/or heat exchanger 68 to further heat the water/steam in the boiler 12, mixer 25, and the like. As described previously, condensate from the flash tank 71 is directed to the deaerator 274 to join the feedwater for warming and repetition of the heating cycle. In an embodiment, a small circulation pump 40 may be employed to facilitate circulation for water for reheating by the heated steam from the turbine in heat exchanger 268. Valve 67 provides isolation during normal operation of the boiler 12.

Furthermore, once again, optional compressor(s) 64, 65 (FIG. 5) may be employed to increase the pressure of heated steam from the high-pressure section 52 of the turbine 50 to also provide heated steam to the thermal energy storage system 90. Likewise, optional compressor 64 (FIG. 5) may be employed under selected conditions to equalize pressures as steam is directed to the turbine 50. For example, when the heat is provided by the thermal energy storage system 90 or the flash tank 70.

Advantageously, in this embodiment, employing heat exchanger 68 with the thermal energy storage system 90 in an isolated loop enables simplified interaction at different pressures as need be and facilitates charging or adding heat to the thermal energy storage system from a variety of sources that may be utilized as needed for warming of the boiler 12 independent of the operation for the turbine in a ventilation or partial ventilation scheme.

Figure 8:
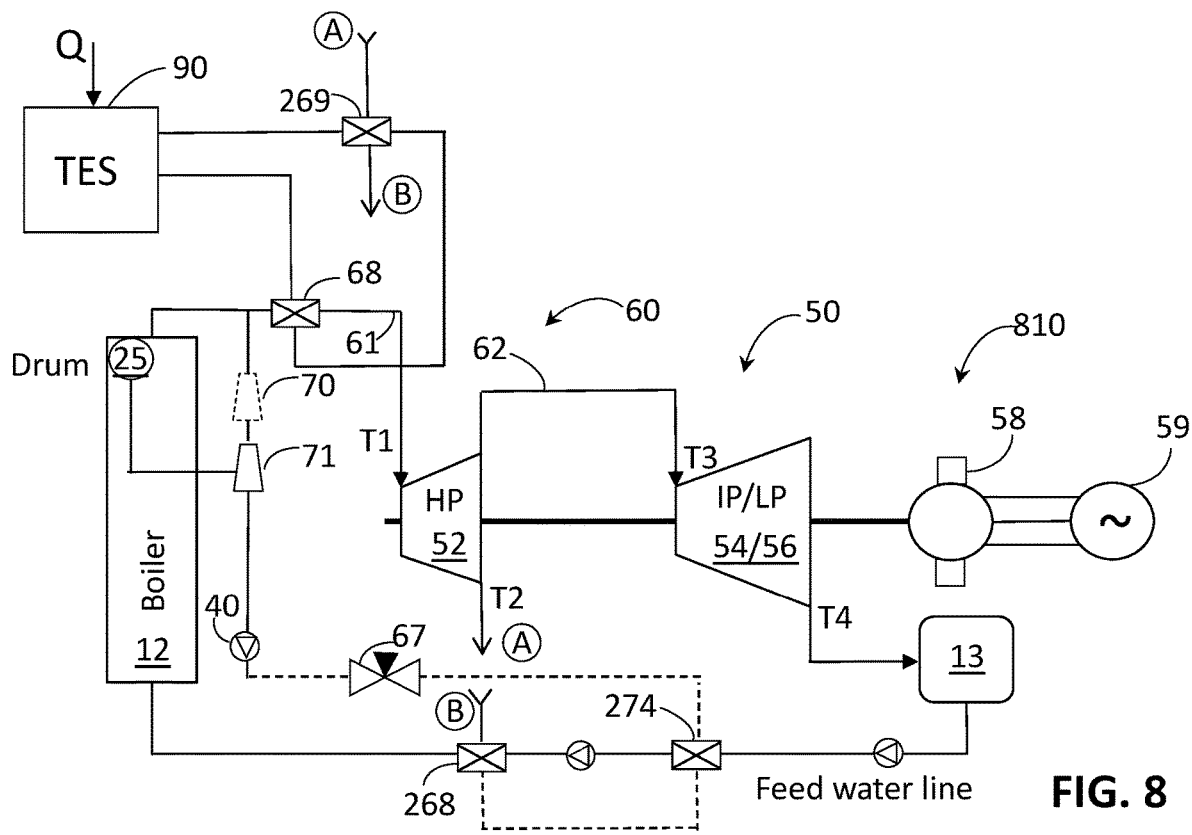
FIG. 8 is a schematic illustration of a boiler of the power generation system in accordance with an embodiment.

FIG. 8 depicts another simplified schematic of a system for heat loss reduction and prewarming at least a portion of a power generation system, now denoted as 810 in accordance with an embodiment. The system 810 is similar to that described with respect to FIGS. 2-7 once again with varied or additional components and features with particular similarity to FIGS. 5, 6, and 7. In this embodiment, the heat generated by the turbine 50 or other sources may be captured and utilized to warm/maintain the temperature of the boiler 12 and reduces either auxiliary heating or discharge from thermal energy storage 90.

In an embodiment, during normal operation of the boiler 12, heat may be directed to the thermal energy storage system 90 either from external sources or via heat exchanger 68. Likewise, when the boiler 12 is inoperative, heat from the thermal energy storage system 90 as directed back to the boiler 12 and high-pressure section 52 of the turbine 50 as described earlier. Heated steam from the turbine 50, operating in a partial power as described herein, is directed to heat exchanger 269 via connection A located on the cold return pipe of the thermal energy storage system 90 to exchange heat with the thermal energy storage system 90. The heated steam is subsequently directed via connection B to heat exchanger 268, thereby exchanging heat with the feedwater to the boiler 12 as described previously herein, thereby providing heating to the boiler 12 as described previously. In addition, steam from the flash tank 71 is heated further with heat from thermal energy storage system 90 via heat exchanger 68, as described earlier, prior to being directed to the turbine 50 for further heating and/or expansion. As described previously, condensate from the flash tank 71 is directed to the deaerator 274 to join the feedwater for reheating and repetition of the heating cycle. In an embodiment, a small circulation pump 40 may be employed, but is not necessary, in some embodiments to facilitate circulation of the water for reheating. Valve 67 provides isolation during normal operation of the boiler 12.

Furthermore, as with earlier embodiments, an optional auxiliary heater 70 may be employed in addition to, or as an alternative, to the ventilation or partial ventilation of the turbine 50 or heat provided by the thermal energy storage system 90, to provide additional heating to the steam for heating the boiler 12 and the like. Moreover, optional compressor(s) 64, 65 (see FIG. 5) may be employed to increase the pressure of heated steam from the high-pressure section 52 of the turbine 50 to also provide heated steam to the thermal energy storage system 90. Likewise, optional compressor 64 (see FIG. 5) may be employed under selected conditions to equalize pressures as steam is directed to the turbine 50. For example, when the heat is provided by the thermal energy storage system 90 or the flash tank 71.

Advantageously, in this embodiment, employing heat exchangers 68, 268, and 269 with the thermal energy storage system 90 in an isolated loop enables simplified interaction at different pressures as need be and facilitates charging or adding heat to the thermal energy storage system from a variety of sources that may be utilized as needed for warming of the boiler 12 independent of the operation for the turbine in a ventilation or partial ventilation scheme. As a result, optional compressors 64, 65 may not be needed as the heat exchangers 68, 268, and 269 facilitate exchanging thermal energy between mediums at different pressures, thereby simplifying the configuration of the system.

Figure 9:
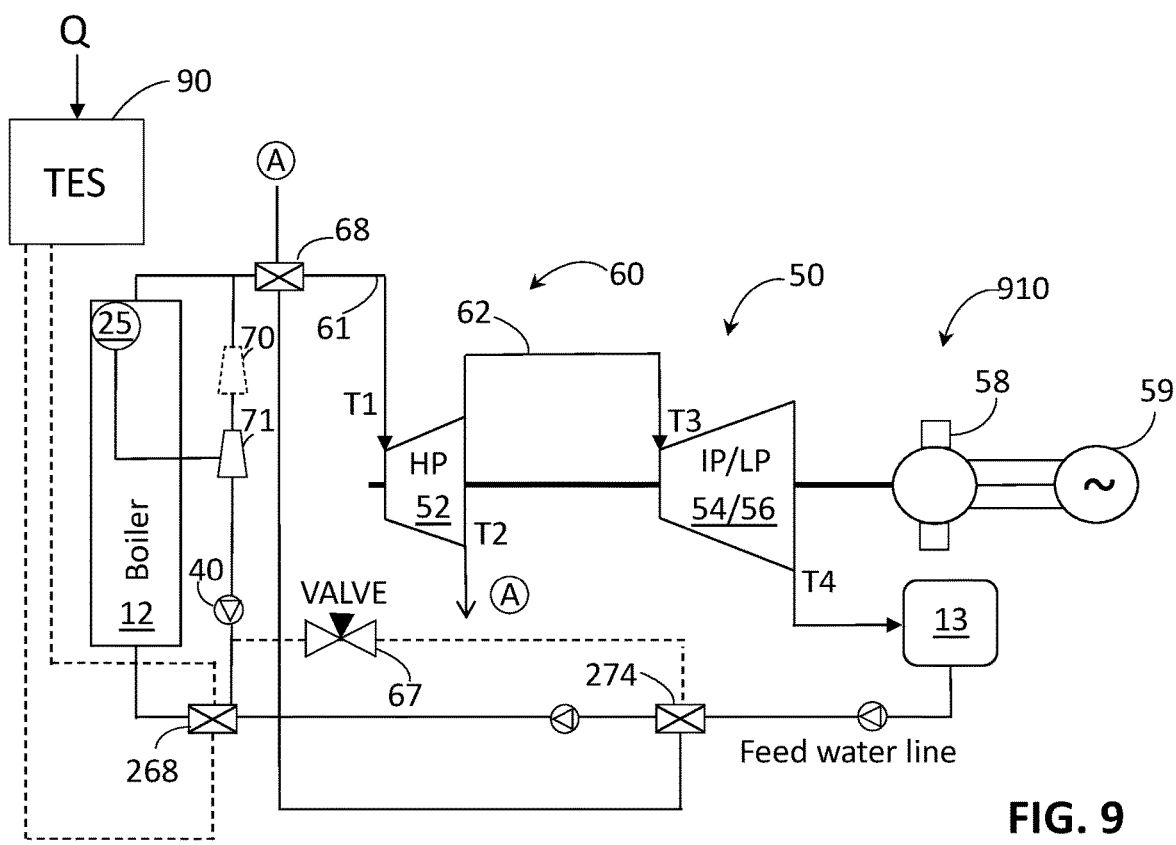
FIG. 9 is a schematic illustration of a boiler of the power generation system in accordance with another embodiment.

FIG. 9 depicts another simplified schematic of a system for heat loss reduction and prewarming at least a portion of a power generation system, now denoted as 910 in accordance with an embodiment. The system 910 is similar to that described with respect to FIGS. 2-8 once again with varied or additional components and features. The thermal energy storage system 90 is located in a different part of the water or steam circulation providing preheating to the boiler feedwater. In an embodiment, during normal operation of the boiler 12, heat may be directed to the thermal energy storage system 90 either from external sources or via heat exchanger 268. Likewise, when the boiler 12 is inoperative, heat from the thermal energy storage system 90 as directed back to the boiler 12 to heat the feedwater line as described earlier. Heated steam from the turbine 50 operating in a partial power as described herein, is directed to heat exchanger 68 via connection A to heat the boiler 12 and mixer. In addition, steam from the flash tank 71 is heated further with heat exchanger 68, as described earlier, prior to being directed to the turbine 50 for further heating and/or expansion. As described previously, condensate from the flash tank 71 is directed to the deaerator 274 to join the feedwater for reheating and repetition of the heating cycle. In an embodiment, a small circulation pump 40 may be employed, but not necessarily, to facilitate circulation for water for reheating. Valve 67 provides isolation during normal operation of the boiler 12.

Furthermore, as with earlier embodiments, an optional auxiliary heater 70 may be employed in addition to, or as an alternative, to provide additional heating to the steam for heating the boiler 12 and the like. Once again, optional compressor(s) 64, 65 (see FIG. 5) may be employed to increase the pressure of heated steam from the high-pressure section 52 of the turbine 50 to also provide heated steam to the thermal energy storage system 90. Likewise, optional compressor 64 (see FIG. 5) may be employed under selected conditions to equalize pressures as steam is directed to the turbine 50. For example, when the heat is provided by the thermal energy storage system 90 or the flash tank 70.

Advantageously, in this embodiment, employing heat exchangers 68, 268 with the thermal energy storage system 90 in an isolated loop enables simplified interaction at different pressures as need be and facilitates charging or adding heat to the thermal energy storage system 90 from a variety of sources that may be utilized as needed for warming of the boiler 12 independent of the operation for the turbine in a ventilation or partial ventilation scheme.

Figure 10:
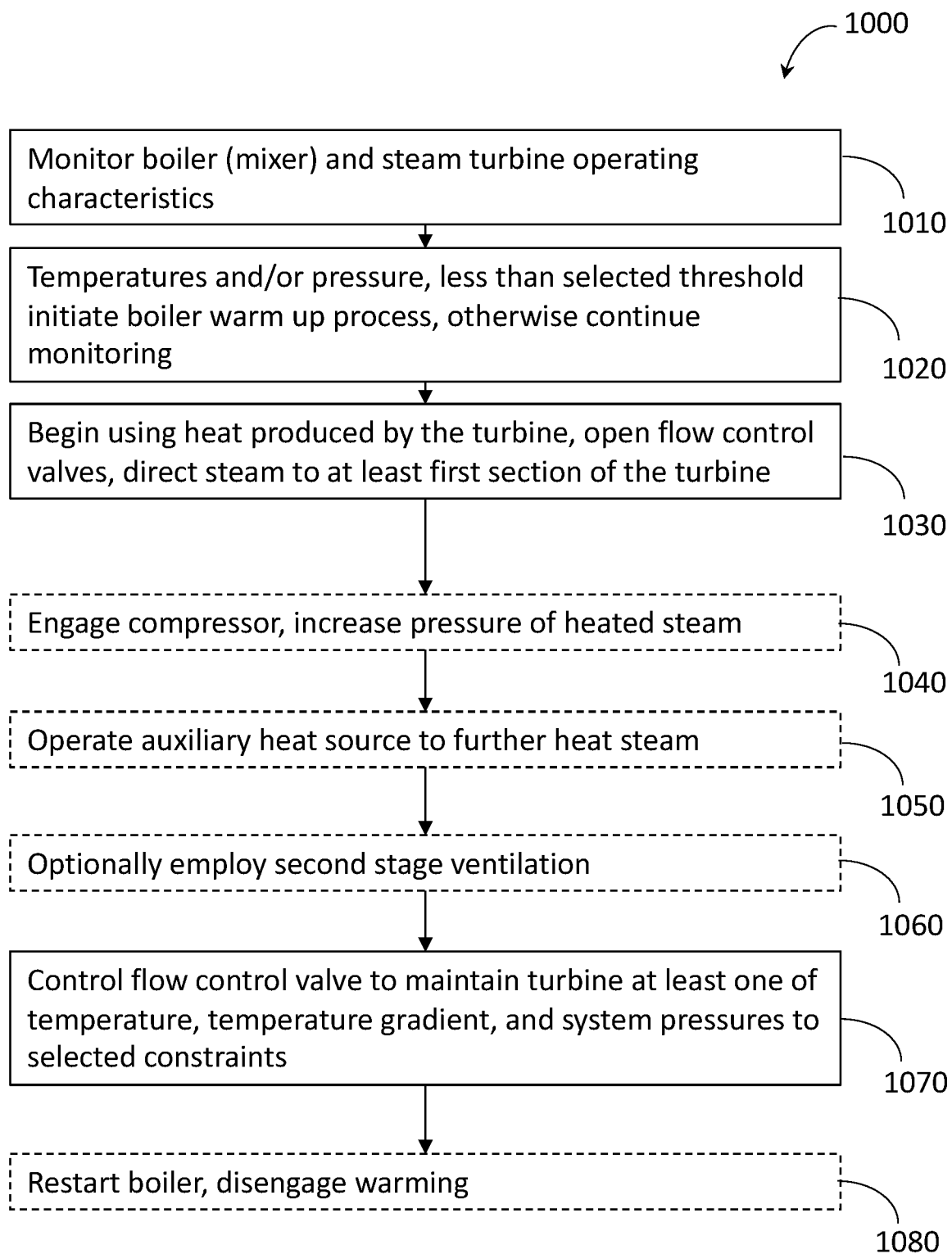
FIG. 10 is a block diagram illustration of a control routine for boiler warming in the power generation system in accordance with an embodiment.

Turning now to FIG. 10 as well, for a description of a method 1000 of operation for employing the turbine 50 in ventilation mode for preheating the steam generation system 10, 210, 310, and the like, in accordance with an embodiment. In an embodiment, a control system is implemented to control the operation of the generator 58 for turbine ventilation, auxiliary heater or boiler 70, flash tank 71, compressors 64, 65, 66, control valves 67, 69, 72 and any isolation valves (not shown), and the like to execute the described methodologies. In an embodiment, such control functions may be implemented wholly or in part in the control unit 100 or another controller. In an embodiment, multiple modes of operation are envisioned. It should be appreciated that while two modes of operation are described, such description is only, for example. Various other and additional modes of operation may readily be envisioned, and it should be well understood that variations and other modes of operation are possible. In an embodiment, a mode of operation for employing the turbine 50 for preheating/warming the steam generation system 10 is directed to warm-up/maintaining boiler temperatures and pressures as may typically be required to facilitate a hot start. Other modes of operation may be directed to maintaining a power generation system operational characteristics, including, but not limited to, temperature and pressures at selected temperatures and pressures for longer durations.

FIG. 10 depicts a method 1000 for reducing heat losses in a boiler and warming the boiler 12 in accordance with an embodiment. Under such conditions, the boiler 12 its waterwall 23, the mixer 25, or at least one steam pipe 61 are maintained warm as desired to facilitate starting. Under such conditions, at process step 1010, the operational characteristics, including, but not limited to temperature and/or pressures of the boiler 12, and/or mixer drum 25, turbine inlet(s), and outlet(s) are monitored. As depicted at process step 1020, if the temperature is less than a selected threshold, the boiler warm-up process is initiated, otherwise, the monitoring continues. It will be appreciated that the particular selected temperature can vary depending on the specific boiler 12, mixer, 20, steam pipes 60, turbine 50, ambient temperatures, and the like. In an embodiment, the boiler 12 is warmed if the temperature falls below about 200° C., though other temperature selections are possible. In an embodiment, it is desired to maintain at least one of the boiler 12, mixer 25, steam pipes 60, and/or turbine 50 at temperatures just sufficiently to maintain their pressures.

Continuing with the method 1000, as depicted at process step 1030, the warm-up process is initiated by directing steam to at least the high-pressure section 52 of the turbine 50, The flow control valve 67 is controlled to permit the flow of heated steam to mixer 25. As depicted at process step 1040, optionally, in an embodiment, the compressor 65 (if employed) is operated to further compress the heated steam and match the pressures in the boiler 12/mixer 25. Optionally, in yet another embodiment, the auxiliary heat source 70 (if employed) or thermal energy storage system 90 is operated, further heating the steam from the mixer 25 as depicted at process step 1050. Optionally it should be understood that the auxiliary heat source 70, thermal energy storage system 90 may be firing, warmed, or pre-charged prior to directing hot water or steam to the boiler 12, though warming the auxiliary heat source 70 is not required. In yet another option, as depicted at process step 1060, intermediate section heating may also be employed to further facilitate boiler warming. It should be appreciated that while various steps of the method 1000 are depicted in a particular order, they need not be, and are described in such order merely to illustrate the examples of the embodiments. Some steps may readily be conducted in a different order. In case an additional amount of heat is required, the generator 58 is activated as a motor to drive 50 and begin imparting work to at least the high pressure section 52 of the turbine 50 (probably as a separate claim)

Continuing with the method 1000, as depicted at process step 1070, the flow of steam through at least the high-pressure section 52 of the turbine 50 is controlled via the flow control valve 67 without exceeding turbine constraints. Continuing with FIG. 10 and the method 1000 reiterates with monitoring the temperature during the boiler warm-up process until selected operational characteristics, including, but not limited to, temperatures or pressures are achieved, or the boiler 12 is restarted as depicted at process step 1070. As depicted at process step 1080, in an embodiment, when it is desired to restart the boiler 12 to return to service, the flow control valves associated with warming e.g., 67, 69, 72 (FIGS. 5, 6), and any other optionally employed equipment are closed, the generator 58 is unexcited and connected to operate as a generator. The boiler 12 and associated equipment are started (e.g., start fans, light-off ignitors, and oil/NG burner firing). Advantageously, the firing rate for the boiler 12 may be increased quickly to the highest rate possible, as each of the components is prewarmed. When the steam flow has been established as depicted at process step 1090, the auxiliary heat source 70 may be maintained in continuous operation to continuing aiding the warming and restarting if desired.

The power generation system and control therefor, provided by the described embodiments provide financial, emissions, and operational benefits to operators. In particular, fuel savings and emissions reductions can be achieved by optimizing the warming time of the boiler. The power generation system 10 provides for main boiler 12 shut down and restart by precision control of turbine ventilation, optional compressors e.g., 64, 65, 66, and an optional auxiliary heat source 70, and/or flash tank 71 and a selective boiler/mixer warming process. For example, significant savings may be realized for each boiler 12 in operation by facilitating main boiler shut down and restart, permitting the power generation system to be more responsive to variations in grid demand. These cost savings can be achieved as a result of the lower amount of fuel and emissions associated with efficiently operating the generator to use the turbine to facilitate system warming and restarts. The reduction also results in improved emissions as the operation of the main boiler 12 at inefficient conditions of reduced power is avoided. Furthermore, employing the turbine ventilation or partial ventilation for warming while the main boiler 12 is inoperative avoids the need to operate or use auxiliary power that is needed to operate the downstream equipment, including fans and pumps for the required air quality control equipment. The reduction in auxiliary power translates into the need for less fuel and steam to achieve a given production level, which, in turn, further reduces the fuel requirements and increases efficiency.

In addition to operational savings, the power generation system of the described embodiments provides for capital cost savings on new plant or boiler design and constructions. In particular, with the control system disclosed herein, it is possible to design/plan equipment for lower boiler restart constraints. Furthermore, the power generation system of the described embodiments provides for capital and recurring cost savings on existing retrofitted plant or boiler designs and constructions. In particular, with the system and methodology disclosed herein, it is possible to modify existing equipment for lower restart constraints while achieving faster restarts.

While the power generation system of the described embodiments allows for the real-time monitoring of numerous operational parameters that are utilized by a controller to precisely control turbine ventilation and boiler warming, the described embodiments are not so limited in this regard. In particular, the various sensor feedback and being used in boiler warming process control can be stored and compiled for use in diagnostic and predictive analytics for asset performance and maintenance assessments of the process and equipment. That is, the data obtained from the various sensors and measurement devices can be stored or transmitted to a central controller or the like so that equipment and process performance can be assessed and analyzed. For example, the sensor feedback can be utilized to assess equipment health, for use in scheduling maintenance, repairs, and/or replacement.

In an embodiment, a system for warming a steam-driven power generation system is described. The system includes a boiler system, including a main boiler, the boiler system operative to generate steam, and a mixer with an input fluidly coupled to the boiler. The system also includes a plurality of steam pipes, the plurality of steam pipes including a first steam pipe, and a second steam pipe and a turbine having at least a first section of the turbine operable to receive steam. An input to the first section of the turbine is fluidly connected via the first steam pipe to an output of at least one of the boiler and the mixer and operable to carry steam from the boiler system at a first temperature to the first section of the turbine, wherein an output of the first section of the turbine is fluidly connected to the second steam pipe, and the second steam pipe is operable to carry heated steam at a second temperature from an output of the turbine to an at least one of an input to the boiler and an input of the mixer, and a thermal energy storage system when the boiler is inoperative and not generating steam, and at least one of: a first heat exchanger operably connected to receive the heated steam at the second temperature from the output of at least the first section of the turbine and transfer heat to at least one of water and steam in the boiler or the mixer, feedwater for the boiler, and a thermal energy storage system; and a flash tank operable to receive heated water and steam from the boiler or the mixer at a first temperature and first pressure and flash it to steam at a lower pressure, the flash tank operable to provide the steam at a lower pressure to the turbine In addition to one or more of the features described above, or as an alternative, further embodiments of the system may include a first flow control valve operable to control a flow of steam through the first section of the turbine, a sensor the sensor operable to monitor at least one operating characteristic in the boiler system, and a generator operably connected to the turbine, the generator operable as a motor and configured to receive power from the grid and drive the turbine. The system includes a control unit configured to receive information associated with the monitored operating characteristic and control at least one of the generator and first flow control valve to control the amount of steam directed through the turbine under selected conditions and when the main boiler system is not generating steam.

In addition to one or more of the features described above, or as an alternative, further embodiments of the system may include that the at least one operating characteristic is measured in the at least one of the plurality of steam pipes, the main boiler, the mixer, and the turbine.

In addition to one or more of the features described above, or as an alternative, further embodiments of the system may include that the at least one operating characteristic is measured at the outlet of the first section of the turbine.

In addition to one or more of the features described above, or as an alternative, further embodiments of the system may include that the at least one operating characteristic includes at least one of a temperature and a pressure.

In addition to one or more of the features described above, or as an alternative, further embodiments of the system may include that the amount of steam supplied to the first section of the turbine is controlled to maintain selected constraints of at least one of the first section of the turbine.

In addition to one or more of the features described above, or as an alternative, further embodiments of the system may include that the selected constraints include at least one of a temperature, temperature gradient, and a pressure.

In addition to one or more of the features described above, or as an alternative, further embodiments of the system may include that the selected constraints include at least one of a temperature of 485° C. and a pressure of 28 bar.

In addition to one or more of the features described above, or as an alternative, further embodiments of the system may include a first compressor, the first compressor operably connected between the output of the first section of the turbine and at least one of the input to the boiler and the input to the mixer, the first compressor controllable by the controller and operable to receive the heated steam from the first section of the turbine and increase at least one of a pressure or a temperature thereof.

In addition to one or more of the features described above, or as an alternative, further embodiments of the system may include that the first compressor increases the pressure of the heated steam to at least a pressure of that in the at least one of the boiler and the mixer.

In addition to one or more of the features described above, or as an alternative, further embodiments of the system may include an auxiliary heat source operative to provide steam to at least one of the boiler, the mixer, the steam pipes, and the first section of the turbine and wherein the controller is operable to control the auxiliary heat source so that steam heated and directed to the at least one of the boiler, the mixer, and the first section of the turbine.

In addition to one or more of the features described above, or as an alternative, further embodiments of the system may include that the auxiliary heat source provides sufficient heat with the turbine to maintain at least one of the boiler, the mixer, the steam pipes, and the turbine at a desired temperature or pressure.

In addition to one or more of the features described above, or as an alternative, further embodiments of the system may include the turbine having at least a second section, wherein an input to the second section of the turbine is fluidly connected and operable to receive steam at a third temperature from at least one of an output of the first section of the turbine, an output of the boiler and an output the mixer; wherein an output of the second section of the turbine is fluidly connected and operable to carry steam at a fourth temperature from an output of the second section turbine to an at least one of an input to the boiler and an input of the mixer.

In addition to one or more of the features described above, or as an alternative, further embodiments of the system may include a second flow control valve operable to control a flow of steam through the second section of the turbine; and wherein the control unit is configured to receive information associated with another monitored operating characteristic and control the second flow control valve, to control the amount of steam directed through the second section of the turbine.

In addition to one or more of the features described above, or as an alternative, further embodiments of the system may include that the heated steam at a fourth temperature from an output of the intermediate-pressure section turbine is at a higher temperature than the steam at a third temperature from at least one of an output of the first section of the turbine, an output of the boiler and an output the mixer.

In addition to one or more of the features described above, or as an alternative, further embodiments of the system may include a second compressor, the second compressor operably connected between the output of the second section of the turbine and at least one of the input to the boiler and the input to the mixer, the second compressor controllable by the controller and operable to receive the heated steam from the second section of the turbine and increase at least one of a pressure or a temperature thereof.

In addition to one or more of the features described above, or as an alternative, further embodiments of the system may include that the second compressor increases the pressure of the heated steam to at least a pressure of that in the at least one of the boiler and the mixer.

In addition to one or more of the features described above, or as an alternative, further embodiments of the system may include that a heat exchanger operably connected to receive the heated steam from the first section of the turbine at a first pressure and transfer heat to at least one of water and steam in the boiler or the mixer at another pressure.

In addition to one or more of the features described above, or as an alternative, further embodiments of the system may include that an amount of steam directed through the turbine under selected conditions is configured to provide sufficient heating to at least one of the boiler, the steam pipes, the mixer, and the turbine to maintain each at a selected temperature or pressure.

In addition to one or more of the features described above, or as an alternative, further embodiments of the system may include that the at least one operating characteristic is measured at the main boiler, the mixer, or the turbine.

In addition to one or more of the features described above, or as an alternative, further embodiments of the system may include that the amount of steam supplied to the firsts section of the turbine is controlled to maintain selected constraints of at least one of the first section of the turbine the steam pipes, or the connections thereof.

In addition to one or more of the features described above, or as an alternative, further embodiments of the system may include that at least one of the first section and the second section of the turbine is operating in ventilation or partial ventilation mode.

In addition to one or more of the features described above, or as an alternative, further embodiments of the system may include that the first section of the turbine is a high-pressure section, and the second section of the turbine is an intermediate power section.

In another embodiment, described herein is a method of warming a power generation system, having a boiler system including a main boiler and a mixer, the main boiler operative to generate steam when operating, and the mixer with an input fluidly coupled to the main boiler. The method including operably connecting a flow of steam at a first temperature from the mixer or the main boiler to at least a first section of a turbine operable to receive steam, operably connecting an output of the first section of the turbine to at least one of an input to the boiler and an input of the mixer to carry heated steam at a second temperature therefrom when the boiler is inoperative and not generating steam. The method also includes operably connecting at least one of: a first heat exchanger operably connected to receive the heated steam at the second temperature from the output of at least the first section of the turbine and transfer heat to at least one of water and steam in the boiler or the mixer, feedwater for the boiler, and a thermal energy storage system; and a flash tank operable to receive heated water and steam from the boiler or the mixer at a first temperature and first pressure and flash it to steam at a lower pressure.

In addition to one or more of the features described above, or as an alternative, further embodiments of the method may include operably connecting a first flow control valve, the first flow control valve operable to control a flow of steam through the first section of the turbine, and operably connecting a generator to the turbine, the generator operable as a motor and configured to receive power from the grid and drive the turbine. The method also includes monitoring at least one operating characteristic in the boiler system, receiving information associated with the monitored operating characteristic with a controller, and controlling at least one of the flow control valve and the generator to control the amount of steam directed through the first section of the turbine under selected conditions when the main boiler system is not generating steam to warm the boiler.

In addition to one or more of the features described above, or as an alternative, further embodiments of the method may include that the at least one operating characteristic is a temperature measured at least one of the main boiler, the mixer, the steam pipe, and the turbine.

Finally, it is also to be understood that the various systems and control unit 100 used therewith may include the necessary electronics, software, memory, storage, databases, firmware, logic/state machines, microprocessors, communication links, displays, or other visual or audio user interfaces, printing devices, and any other input/output interfaces to perform the functions described herein and/or to achieve the results described herein. For example, as previously mentioned, the systems may include at least one processor and system memory/data storage structures, which may include random access memory (RAM) and read-only memory (ROM). The at least one processor of the systems may include one or more conventional microprocessors and one or more supplementary co-processors such as math co-processors or the like. The data storage structures discussed herein may include an appropriate combination of magnetic, optical, and/or semiconductor memory, and may include, for example, RAM, ROM, flash drive, an optical disc such as a compact disc and/or a hard disk or drive.

Additionally, a software application that adapts the controller to perform the methods disclosed herein may be read into a main memory of the at least one processor from a computer-readable medium. Thus, embodiments of the present invention may perform the methods disclosed herein in real-time. The term "computer-readable medium," as used herein, refers to any medium that provides or participates in providing instructions to the at least one processor of the systems (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, solid-state drive (SSD), magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

While in embodiments, the execution of sequences of instructions in the software application causes at least one processor to perform the methods/processes described herein, hard-wired circuitry may be used in place of, or in combination with, software instructions for implementation of the described methods/processes. Therefore, embodiments, as described herein, are not limited to any specific combination of hardware and/or software.

As used herein, "electrical communication" or "electrically coupled" means that certain components are configured to communicate with one another through direct or indirect signaling by way of direct or indirect electrical connections. As used herein, "mechanically coupled" refers to any coupling method capable of supporting the necessary forces for transmitting torque between components. As used herein, "operatively coupled" refers to a connection, which may be direct or indirect. The connection is not necessarily being a mechanical attachment.

As used herein, an element or step recited in the singular and preceded with the word "a" or "an" should be understood as not excluding plural of said elements or steps, unless such exclusion is explicitly stated. Furthermore, references to "one embodiment" of the described embodiments are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Additionally, while the dimensions and types of materials described herein are intended to define the parameters associated with the described embodiments, they are by no means limiting and are exemplary embodiments. Many other embodiments will be apparent to those of skill in the art upon reviewing the above description. The scope of the invention should, therefore, be determined with reference to the appended claims. Such description may include other examples that occur to one of ordinary skill in the art, and such other examples are intended to be within the scope of the claims if they have structural elements that do not differ from the literal language of the claims, or if they include equivalent structural elements with insubstantial differences from the literal languages of the claim. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format are not intended to be interpreted as such, unless and until such claim limitations expressly use the phrase "means for" followed by a statement of function void of further structure.

What is claimed is:

1. A system for warming a steam-driven power generation system, comprising:
    a boiler system comprising:
        a main boiler, the main boiler operative to generate steam; and
        a mixer with an input fluidly coupled to the main boiler;
    a plurality of steam pipes, the plurality of steam pipes having a first steam pipe and a second steam pipe;
    a turbine having at least a first section operable to receive steam, wherein an input to the first section of the turbine is fluidly connected via the first steam pipe to an output of at least one of the main boiler and the mixer and operable to carry steam from the boiler system at a first temperature to the first section of the turbine, wherein an output of the first section of the turbine is fluidly connected to the second steam pipe, and the second steam pipe is operable to carry heated steam at a second temperature from the output of the first section of the turbine to at least one of an input to the main boiler and an input of the mixer when the main boiler is inoperative and not generating steam;
    a first heat exchanger operably connected to receive the heated steam at the second temperature from the output of at least the first section of the turbine and transfer heat to at least one of water and steam from the main boiler or the mixer, and feedwater for the main boiler; and
    a flash tank operable to receive heated water and steam from one of the main boiler and the mixer at the first temperature and a first pressure and flash it to steam at a lower pressure, the flash tank operable to provide the steam at the lower pressure to the first section of the turbine.

2. The system for warming a steam-driven power generation system of claim 1, further including:
a first flow control valve operable to control a flow of steam through the first section of the turbine;
a sensor, the sensor operable to monitor at least one operating characteristic in the boiler system; and
a control unit configured to receive information associated with the monitored operating characteristic and control at least the first flow control valve to control the amount of steam directed through at least the first section of the turbine under selected conditions and when the boiler system is not generating steam.

3. The system for warming a steam-driven power generation system of claim 2, wherein:
the at least one operating characteristic is measured in at least one of the plurality of steam pipes, the main boiler, the mixer, and the turbine.

4. The system for warming a steam-driven power generation system of claim 3, wherein:
the at least one operating characteristic comprises at least one of a temperature and a pressure.

5. The system for warming a steam-driven power generation system of claim 1, wherein the amount of steam supplied to the first section of the turbine is controlled to maintain selected constraints of at least the first section of the turbine.

6. The system for warming a steam-driven power generation system of claim 5, wherein:
the selected constraints comprise at least one of a temperature, temperature gradient, and a pressure.

7. The system for warming a steam-driven power generation system of claim 1, further comprising a thermal energy storage system, the thermal energy storage system operably connected to at least the main boiler or the mixer and operable to transfer heat to the main boiler.

8. The system for warming a steam-driven power generation system of claim 7, wherein the thermal energy storage system is at least one of a molten salt system, and any other liquid/solid sensible storage media.

9. The system for warming a steam-driven power generation system of claim 7, wherein the thermal energy storage system is configured to provide heat to the steam flowing from the flash tank to the first section of the turbine.

10. The system for warming a steam-driven power generation system of claim 7, wherein the thermal energy storage system is configured to operate in a charging mode that stores heat obtained from at least one of the steam-driven power generation system during normal operation or a renewable energy source.

11. The system for warming a steam-driven power generation system of claim 7, wherein the thermal energy storage system is configured to operate in a discharging mode to provide heating to at least one of the main boiler, the steam piping or the first section of the turbine, wherein a discharging time of the thermal energy storage system is reduced as a function of the heat provided by the turbine under a low load operation.

12. The system for warming a steam-driven power generation system of claim 7, further comprising:
a second heat exchanger operably connected to transfer heat to and from the thermal energy storage system at a given temperature or pressure to at least one of water and steam in the main boiler or the mixer at another pressure.

13. The system for warming a steam-driven power generation system of claim 1, further comprising:
a first compressor, the first compressor operably connected between the output of the first section of the turbine and at least one of the input to the main boiler and the input to the mixer, the first compressor operable to receive the heated steam from the first section of the turbine and increase at least one of a pressure or a temperature thereof.

14. The system for warming a steam-driven power generation system of claim 13, wherein:
the first compressor increases a pressure of the heated steam to at least a pressure of that in at least one of the main boiler and the mixer.

15. The system for warming a steam-driven power generation system of claim 13, further comprising:
a second compressor, the second compressor operably connected between the main boiler or the mixer and an input to the first section of the turbine, the second compressor operable to increase at least one of a pressure or a temperature of the steam supplied to the first section of the turbine.

16. The system for warming a steam-driven power generation system of claim 1, further comprising:
an auxiliary heat source operative to provide steam to at least one of the main boiler, the mixer, the steam pipes, and the first section of the turbine;
wherein the auxiliary heat source is configured to heat and direct steam to at least one of the boiler, the mixer, and the first section of the turbine.

17. The system for warming a steam-driven power generation system of claim 16, wherein:
the auxiliary heat source provides sufficient heat with the first section of the turbine to maintain at least one of the main boiler, the mixer, the steam pipes, and the first section of the turbine at a desired temperature or pressure.

18. The system for warming a steam-driven power generation system of claim 1, further comprising:
the turbine having at least a second section, wherein an input to the second section of the turbine is fluidly connected and operable to receive steam at a third temperature from the output of the first section of the turbine, wherein an output of the second section of the turbine is fluidly connected and operable to carry steam at a fourth temperature from the output of the second section of the turbine to at least one of an input to the main boiler and an input of the mixer.

19. The system for warming a steam-driven power generation system of claim 18, wherein:
the heated steam at the fourth temperature from the output of the second section turbine is at a higher temperature than the steam at the third temperature from at least one of an output of the first section of the turbine, an output of the main boiler, and an output of the mixer.

20. The system for warming a steam-driven power generation system of claim 18, wherein at least one of the first section and the second section of the turbine is operating in a ventilation mode or partial ventilation mode.

21. The system for warming a steam-driven power generation system of claim 18, wherein the first section of the turbine is a high-pressure section, and the second section of the turbine is an intermediate-pressure section.

22. The system for warming a steam-driven power generation system of claim 1, wherein:
an amount of steam directed through the at least the first section of the turbine under selected conditions is configured to provide sufficient heating to at least one of the main boiler, the steam pipes, the mixer, and the first section of the turbine to maintain each at a selected temperature or pressure.

23. The system for warming a steam-driven power generation system of claim 1, further comprising:
a generator operably connected to the turbine, the generator operable as a motor and configured to receive power from a grid and drive the turbine or be driven by the turbine and generate electricity to direct power to the grid; and
a control unit configured to receive information associated with monitored operating characteristics and control at least the generator under another selected condition.

24. A method of warming a power generation system, having a boiler system comprising a main boiler and a mixer, the main boiler operative to generate steam and the mixer with an input fluidly coupled to the main boiler, the method comprising:
operably connecting a flow of steam to at least a first section of a turbine operable to receive steam at a first temperature;
operably connecting an output of the first section of the turbine to at least one of an input to the main boiler and an input of the mixer for carrying heated steam at a second temperature thereto when the main boiler is inoperative;
operably connecting a first heat exchanger to receive the heated steam at the second temperature from the output of at least the first section of the turbine and transfer heat to at least one of water and steam from the main boiler or the mixer, and feedwater for the main boiler; and
operably connecting a flash tank to receive heated water and steam from one of the main boiler and the mixer at the first temperature and a first pressure and flash it to steam at a lower pressure, the flash tank operable to provide the steam at the lower pressure to the first section of the turbine.

25. The method of claim 24, further including:
operably connecting a first flow control valve, the first flow control valve operable to control a flow of steam through the first section of the turbine;
monitoring at least one operating characteristic in the boiler system;
receiving information associated with the monitored operating characteristic with a control unit; and
controlling with the control unit at least one of the first flow control valve to control the amount of steam directed through at least the first section of the turbine under selected conditions.

26. The method of claim 24, further comprising operably connecting a thermal energy storage system to at least the main boiler or the mixer.

27. A system for warming a steam-driven power generation system, comprising:
a boiler system comprising:
a main boiler, the main boiler operative to generate steam; and
a mixer with an input fluidly coupled to the main boiler;
a plurality of steam pipes, the plurality of steam pipes having a first steam pipe and a second steam pipe;
a turbine having at least a first section operable to receive steam, wherein an input to the first section of the turbine is fluidly connected via the first steam pipe to an output of at least one of the main boiler and the mixer and operable to carry steam from the boiler system at a first temperature to the first section of the turbine, wherein an output of the first section of the turbine is fluidly connected to the second steam pipe, and the second steam pipe is operable to carry heated steam at a second temperature from the output of the first section of the turbine to at least one of an input to the main boiler and an input of the mixer when the main boiler is inoperative and not generating steam;
a heat exchanger operably connected to receive the heated steam at the second temperature from the output of at least the first section of the turbine and transfer heat to at least one of water and steam from the main boiler or the mixer, and feedwater for the main boiler;
a flash tank operable to receive heated water and steam from one of the main boiler and the mixer at the first temperature and a first pressure and flash it to steam at a lower pressure, the flash tank operable to provide the steam at the lower pressure to the first section of the turbine; and
a thermal energy storage system, the thermal energy storage system operably connected to at least the main boiler or the mixer and operable to transfer heat to the main boiler.

* * * * *